US009219911B2

(12) United States Patent
Ushiki et al.

(10) Patent No.: US 9,219,911 B2
(45) Date of Patent: Dec. 22, 2015

(54) IMAGE PROCESSING APPARATUS, IMAGE PROCESSING METHOD, AND PROGRAM

(75) Inventors: Suguru Ushiki, Tokyo (JP); Takafumi Morifuji, Tokyo (JP); Masami Ogata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1092 days.

(21) Appl. No.: 13/082,397

(22) Filed: Apr. 7, 2011

(65) Prior Publication Data

US 2011/0254925 A1 Oct. 20, 2011

(30) Foreign Application Priority Data

Apr. 14, 2010 (JP) ................................ P2010-092816

(51) Int. Cl.

| | |
|---|---|
| ***H04N 13/02*** | (2006.01) |
| ***H04N 13/04*** | (2006.01) |
| ***H04N 13/00*** | (2006.01) |
| ***H04N 21/431*** | (2011.01) |
| ***H04N 21/4402*** | (2011.01) |
| ***H04N 21/45*** | (2011.01) |
| ***H04N 21/81*** | (2011.01) |
| ***H04N 21/84*** | (2011.01) |

(52) U.S. Cl.

CPC ....... *H04N 13/0497* (2013.01); *H04N 13/0022* (2013.01); *H04N 13/0029* (2013.01); *H04N 21/431* (2013.01); *H04N 21/440263* (2013.01); *H04N 21/4516* (2013.01); *H04N 21/816* (2013.01); *H04N 21/84* (2013.01)

(58) Field of Classification Search

CPC ......................... H04N 13/0022; H04N 21/816

USPC ...................................................... 348/46, 47

See application file for complete search history.

(56) References Cited

U.S. PATENT DOCUMENTS

| | | | | |
|---|---|---|---|---|
| 6,262,743 | B1 * | 7/2001 | Allio | 345/427 |
| 2009/0096863 | A1 * | 4/2009 | Kim et al. | 348/42 |

FOREIGN PATENT DOCUMENTS

| | | |
|---|---|---|
| CN | 1448029 A | 10/2003 |
| JP | 10-327430 | 12/1998 |
| JP | 2006-115246 | 4/2006 |

(Continued)

OTHER PUBLICATIONS

Notification of Reasons for Refusual with English language translation issued by Japanese Patent Office on Jul. 11, 2013, in corresponding Japanese application No. 2010-092816.

(Continued)

*Primary Examiner* — Thai Tran
*Assistant Examiner* — Jose Mesa
(74) *Attorney, Agent, or Firm* — Oblon, McClelland, Maier & Neustadt, L.L.P.

(57) ABSTRACT

An image processing apparatus includes a first acquiring unit, a second acquiring unit, and a correction processor. The first acquiring unit acquires an intended viewing environment parameter, which is a parameter of an intended viewing environment, together with image data of a three-dimensional picture. The second acquiring unit acquires an actual viewing environment parameter, which is a parameter of an actual viewing environment for a user viewing the three-dimensional picture. The correction processor corrects the three-dimensional picture in accordance with a difference between the acquired intended viewing environment parameter and the acquired actual viewing environment parameter.

16 Claims, 21 Drawing Sheets

START
OBTAIN INTENDED VIEWING ENVIRONMENT PARAMETERS AND ACTUAL VIEWING ENVIRONMENT PARAMETERS — S51
DETECT AMOUNT OF PARALLAX BETWEEN EACH PIXEL OF LEFT-EYE IMAGE AND THE CORRESPONDING PIXEL OF RIGHT-EYE IMAGE — S52
S53: IS VIEWING DISTANCE DIFFERENT? — YES / NO
DETERMINE VIRTUAL INTER-CAMERA DISTANCE IN ACCORDANCE WITH A CHANGE IN VIEWING DISTANCE — S54
GENERATE LEFT-EYE IMAGE AND RIGHT-EYE IMAGE WITH SUPPLIED VIRTUAL INTER-CAMERA DISTANCE — S55
S56: IS DISPLAY SIZE DIFFERENT? — YES / NO
DETERMINE VIRTUAL INTER-CAMERA DISTANCE AND IMAGE SCALING AMOUNT IN ACCORDANCE WITH A CHANGE IN VIEWING DISTANCE — S57
GENERATE LEFT-EYE IMAGE AND RIGHT-EYE IMAGE WITH SUPPLIED VIRTUAL INTER-CAMERA DISTANCE — S58
GENERATE LEFT-EYE IMAGE AND RIGHT-EYE IMAGE WITH SUPPLIED IMAGE SCALING AMOUNT — S59
S60: IS INTER-EYE DISTANCE DIFFERENT? — YES / NO
DETERMINE VIRTUAL INTER-CAMERA DISTANCE AND IMAGE SCALING AMOUNT IN ACCORDANCE WITH A CHANGE IN VIEWING DISTANCE — S61
GENERATE LEFT-EYE IMAGE AND RIGHT-EYE IMAGE WITH SUPPLIED VIRTUAL INTER-CAMERA DISTANCE — S62
GENERATE LEFT-EYE IMAGE AND RIGHT-EYE IMAGE WITH SUPPLIED IMAGE SCALING AMOUNT — S63
END

(56) References Cited

FOREIGN PATENT DOCUMENTS

| | | |
|---|---|---|
| JP | 2008-182669 | 8/2008 |
| JP | 2009-516447 | 4/2009 |
| WO | WO 2004-084560 | 9/2004 |

OTHER PUBLICATIONS

English Language International Search Report in corresponding JP 03 03405, mailed Jul. 1, 2003.

Chinese Office Action dated Jun. 4, 2014, issued for Chinese Application No. 201110091488.X (21 pgs).

* cited by examiner

50
PLAYBACK APPARATUS
20
RECORDING MEDIUM
51
READER
52
DEMULTIPLEXER
53
VIDEO DECODER
56
AUDIO DECODER
55
OPERATION INPUT UNIT
54
CORRECTION PROCESSOR
61
DISPLAY UNIT
62
SPEAKER
ACTUAL VIEWING ENVIRONMENT PARAMETERS
INTENDED VIEWING ENVIRONMENT PARAMETERS

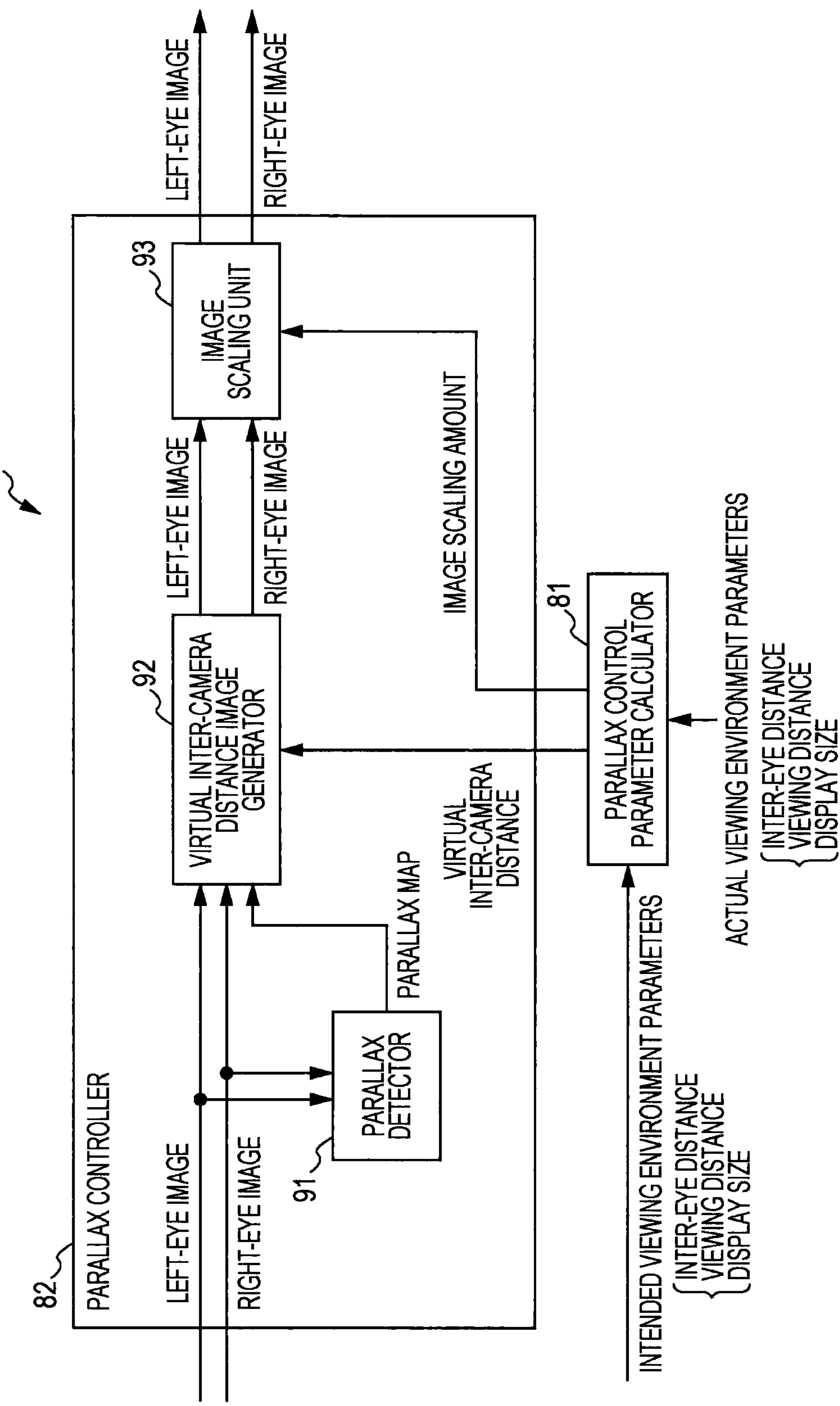
FIG. 9
54
82
PARALLAX CONTROLLER
LEFT-EYE IMAGE
RIGHT-EYE IMAGE
91
PARALLAX DETECTOR
PARALLAX MAP
92
VIRTUAL INTER-CAMERA DISTANCE IMAGE GENERATOR
LEFT-EYE IMAGE
RIGHT-EYE IMAGE
93
IMAGE SCALING UNIT
LEFT-EYE IMAGE
RIGHT-EYE IMAGE
IMAGE SCALING AMOUNT
VIRTUAL INTER-CAMERA DISTANCE
81
PARALLAX CONTROL PARAMETER CALCULATOR
INTENDED VIEWING ENVIRONMENT PARAMETERS
INTER-EYE DISTANCE
VIEWING DISTANCE
DISPLAY SIZE
ACTUAL VIEWING ENVIRONMENT PARAMETERS
INTER-EYE DISTANCE
VIEWING DISTANCE
DISPLAY SIZE

FIG. 18

| DIFFERENCE OF ACTUAL VIEWING ENVIRONMENTS TO INTENDED VIEWING ENVIRONMENTS | CHANGE IN AMOUNT OF PARALLAX | CHANGE IN DEPTH TO BE REPRODUCED (POP-OUT AMOUNT AND RECEDING AMOUNT) | PROCESSING NECESSARY FOR CANCELING CHANGE IN DEPTH TO BE REPRODUCED |
|---|---|---|---|
| VIEWING DISTANCE: x4 LARGER | NO CHANGE | x4 | CHANGE VIRTUAL INTER-CAMERA DISTANCE ACCORDING TO PARALLAX (C(d)=d'/d) |
| VIEWING DISTANCE: x0.25 SMALLER | NO CHANGE | x0.25 | CHANGE VIRTUAL INTER-CAMERA DISTANCE ACCORDING TO PARALLAX (C(d)=d'/d) |
| INTER-EYE DISTANCE: x4 LARGER | NO CHANGE | NONLINEAR DECREASE (EQUATION (7) IN FIG. 15) | GENERATING IMAGE WITH 400% SCALING AMOUNT OR WITH 400% VIRTUAL INTER-CAMERA DISTANCE, OR WITH A COMBINATION OF SCALING AMOUNT AND VIRTUAL INTER-CAMERA DISTANCE (e.g. AFTER GENERATING IMAGE WITH 200% VIRTUAL INTER-CAMERA DISTANCE , PROCESSING IMAGE WITH 200% SCALING AMOUNT |
| INTER-EYE DISTANCE: x0.25 SMALLER | NO CHANGE | NONLINEAR INCREASE (EQUATION (7) IN FIG. 15) | GENERATING IMAGE WITH 25% SCALING AMOUNT OR WITH 25% VIRTUAL INTER-CAMERA DISTANCE, OR WITH A COMBINATION OF SCALING AMOUNT AND VIRTUAL INTER-CAMERA DISTANCE (e.g. AFTER GENERATING IMAGE WITH 50% VIRTUAL INTER-CAMERA DISTANCE , PROCESSING IMAGE WITH 50% SCALING AMOUNT |
| DISPLAY SIZE: x4 LARGER | x4 | NONLINEAR INCREASE (EQUATION (5) IN FIG. 15) | GENERATING IMAGE WITH 25% SCALING AMOUNT OR WITH 25% VIRTUAL INTER-CAMERA DISTANCE, OR WITH A COMBINATION OF SCALING AMOUNT AND VIRTUAL INTER-CAMERA DISTANCE (e.g. AFTER GENERATING IMAGE WITH 50% VIRTUAL INTER-CAMERA DISTANCE, PROCESSING IMAGE WITH 50% SCALING AMOUNT |
| DISPLAY SIZE: x0.25 SMALLER | x0.25 | NONLINEAR DECREASE (EQUATION (5) IN FIG. 15) | GENERATING IMAGE WITH 400% SCALING AMOUNT OR WITH 400% VIRTUAL INTER-CAMERA DISTANCE, OR WITH A COMBINATION OF SCALING AMOUNT AND VIRTUAL INTER-CAMERA DISTANCE (e.g. AFTER GENERATING IMAGE WITH 200% VIRTUAL INTER-CAMERA DISTANCE, PROCESSING IMAGE WITH 200% SCALING AMOUNT |

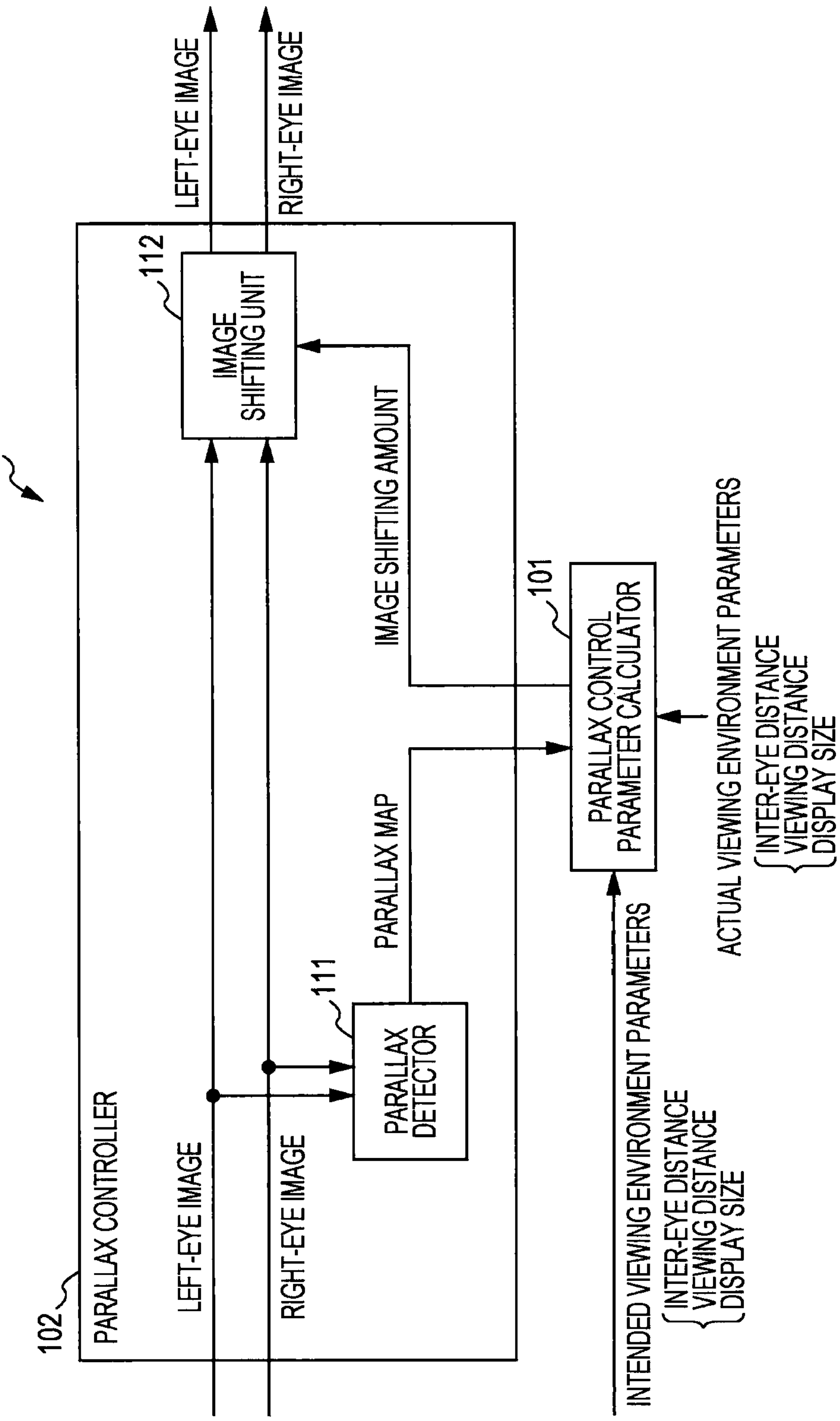
FIG. 23
54
102
PARALLAX CONTROLLER
LEFT-EYE IMAGE
RIGHT-EYE IMAGE
111
PARALLAX DETECTOR
PARALLAX MAP
112
IMAGE SHIFTING UNIT
IMAGE SHIFTING AMOUNT
101
PARALLAX CONTROL PARAMETER CALCULATOR
LEFT-EYE IMAGE
RIGHT-EYE IMAGE
INTENDED VIEWING ENVIRONMENT PARAMETERS
INTER-EYE DISTANCE
VIEWING DISTANCE
DISPLAY SIZE
ACTUAL VIEWING ENVIRONMENT PARAMETERS
INTER-EYE DISTANCE
VIEWING DISTANCE
DISPLAY SIZE

FIG. 24

| DIFFERENCE OF ACTUAL VIEWING ENVIRONMENTS TO INTENDED VIEWING ENVIRONMENTS | CHANGE IN AMOUNT OF PARALLAX | CHANGE IN DEPTH TO BE REPRODUCED (POP-OUT AMOUNT AND RECEDING AMOUNT) | PROCESSING NECESSARY FOR CANCELING CHANGE IN DEPTH TO BE REPRODUCED |
|---|---|---|---|
| VIEWING DISTANCE: x4 LARGER | NO CHANGE | x4 | shift=d·E/(S·E+S·d−d)−d |
| VIEWING DISTANCE: x0.25 SMALLER | NO CHANGE | x0.25 | shift=d·E/(S·E+S·d−d)−d |
| INTER-EYE DISTANCE: x4 LARGER | NO CHANGE | NONLINEAR DECREASE (EQUATION (7) IN FIG. 15) | shift=(S−1)·d |
| INTER-EYE DISTANCE: x0.25 SMALLER | NO CHANGE | NONLINEAR INCREASE (EQUATION (7) IN FIG. 15) | shift=(S−1)·d |
| DISPLAY SIZE: x4 LARGER | x4 | NONLINEAR INCREASE (EQUATION (5) IN FIG. 15) | WHEN MAXIMUM OF ORIGINAL AMOUNTS OF PARALLAX IS 20 PIXELS (=10.6 mm), IT IS INCREASED TO 42.4 mm IN ACCORDANCE WITH INCREASE IN DISPLAY SIZE x4. BY SHIFTING IMAGE OUTWARD BY 31.8 mm (=60 PIXELS), THE CORRECTED MAXIMUM ALSO BECOMES 10.6 mm. |
| DISPLAY SIZE: x0.25 SMALLER | x0.25 | NONLINEAR DECREASE (EQUATION (5) IN FIG. 15) | WHEN MAXIMUM OF ORIGINAL AMOUNTS OF PARALLAX IS 20 PIXELS (=10.6 mm), IT IS DECREASED TO 2.65 mm IN ACCORDANCE WITH DECREASE IN DISPLAY SIZE x0.25. BY SHIFTING IMAGE INWARD BY 7.95 mm (=15 PIXELS), THE CORRECTED MAXIMUM ALSO BECOMES 10.6 mm. |

201
CPU
202
ROM
203
RAM
204
205
INPUT/OUTPUT INTERFACE
206
INPUT UNIT
207
OUTPUT UNIT
208
STORAGE UNIT
209
COMMUNICATION UNIT
210
DRIVE
211
REMOVABLE MEDIA

IMAGE PROCESSING APPARATUS, IMAGE PROCESSING METHOD, AND PROGRAM

BACKGROUND OF THE INVENTION

1. Field of the Invention

The present invention relates to image processing apparatuses, image processing methods, and programs, and more particularly, to an image processing apparatus, an image processing method, and a program that allow users to view three-dimensional (3D) pictures intended by a creator even if actual viewing environments are different from intended viewing environments.

2. Description of the Related Art

Two-dimensional (2D) pictures are mainly used for video content, however, 3D pictures are attracting people's attention these days. Various display apparatuses and various encoding and decoding techniques for 3D pictures have been proposed (for example, see Japanese Unexamined Patent Application Publication Nos. 10-327430 and 2008-182669).

A 3D picture includes a left-eye image viewed with a left eye and a right-eye image viewed with a right eye, and with a predetermined amount of parallax between a left-eye image and a right-eye image, viewers can perceive pictures three-dimensionally.

When creating 3D pictures, a content creator sets the amount of parallax in advance by assuming user viewing environments, such as the viewing distance, the binocular parallax, and the display size.

SUMMARY OF THE INVENTION

However, in many cases, actual viewing environments of a user are different from intended viewing environments, which changes the depth of 3D pictures. More specifically, the amount by which pictures pop out is too large or too small. That is, pictures pop out or recede more than the creator intended. Additionally, the ratio between the depth and the planar size on the screen may change, whereby a cubic shape looks like a rectangular shape, thereby making 3D pictures distorted.

It is thus desirable to allow users to view 3D pictures as those intended by a creator even if actual viewing environments are different from intended viewing environments.

According to an embodiment of the present invention, there is provided an image processing apparatus including first acquiring means, second acquiring means, and correction processing means. The first acquiring means acquires an intended viewing environment parameter, which is a parameter of an intended viewing environment, together with image data of a 3D picture. The second acquiring means acquires an actual viewing environment parameter, which is a parameter of an actual viewing environment for a user viewing the 3D picture. The correction processing means corrects the 3D picture in accordance with a difference between the acquired intended viewing environment parameter and the acquired actual viewing environment parameter.

According to another embodiment of the present invention, there is provided an image processing method for an image processing apparatus including first acquiring means for acquiring data, second acquiring means for acquiring data, and correction processing means for correcting a 3D picture. The image processing method includes the steps of: acquiring by the first acquiring means an intended viewing environment parameter, which is a parameter of an intended viewing environment, together with image data of the 3D picture; acquiring by the second acquiring means an actual viewing environment parameter, which is a parameter of an actual viewing environment for a user viewing the 3D picture; and correcting by the correction processing means the 3D picture in accordance with a difference between the acquired intended viewing environment parameter and the acquired actual viewing environment parameter.

According to still another embodiment of the present invention, there is provided a program allowing a computer to execute processing including the steps of: acquiring an intended viewing environment parameter, which is an intended parameter of a viewing environment, together with image data of a 3D picture; acquiring an actual viewing environment parameter, which is a parameter of an actual viewing environment for a user viewing the 3D picture; and correcting the 3D picture in accordance with a difference between the acquired intended viewing environment parameter and the acquired actual viewing environment parameter.

According to an embodiment of the present invention, an intended viewing environment parameter is acquired together with image data of a 3D picture, and an actual viewing environment parameter for a user viewing the 3D picture is also acquired. The 3D picture is corrected in accordance with the difference between the acquired intended viewing environment parameter and the acquired actual viewing environment parameter.

The program may be provided by being transmitted via a transmission medium or by being recorded on a recording medium.

The image processing apparatus may be an independent apparatus or elements forming an apparatus.

According to an embodiment of the present invention, it is possible to allow users to view 3D pictures intended by a creator even if an actual viewing environment parameter and an intended viewing environment parameter are different.

BRIEF DESCRIPTION OF THE DRAWINGS

FIG. 9 is a block diagram illustrating an example of a correction processor having a first configuration;

FIG. 18 illustrates a summary of first correction processing;

FIG. 23 is a block diagram illustrating an example of the correction processor having the second configuration;

FIG. 24 illustrates a summary of second correction processing;

DESCRIPTION OF THE PREFERRED EMBODIMENTS

Embodiments of the present invention are described below in the following order:

1. Example of configuration of recording apparatus for producing recording medium to be played back by a playback apparatus to which an embodiment of the present invention is applied;
2. Example of overall configuration of playback apparatus to which an embodiment of the present invention is applied;
3. First example of correction processor of playback apparatus;
4. Second example of correction processor of playback apparatus; and
5. Computer to which an embodiment of the present invention is applied.

1. Example of Configuration of Recording Apparatus

Figure 1:
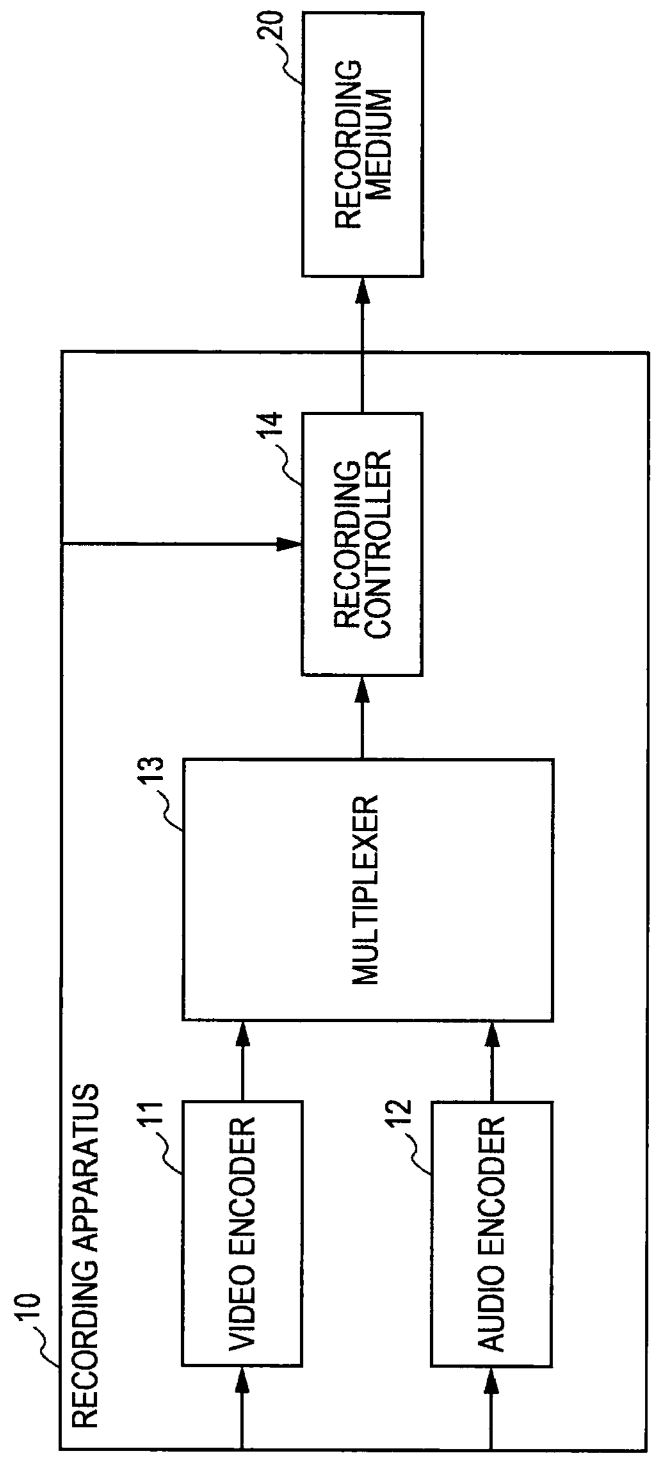
FIG. 1 is a block diagram illustrating an example of the configuration of a recording apparatus according to an embodiment of the present invention.

FIG. 1 is a block diagram illustrating an example of the configuration of a recording apparatus 10 according to an embodiment of the present invention.

The recording apparatus 10 includes a video encoder 11, an audio encoder 12, a multiplexer 13, and a recording controller 14.

The recording apparatus 10 encodes content data of 3D content and records the encoded content data on a recording medium 20, such as a Blu-ray (registered trademark) disc read only memory (BDROM). The content data includes image data of 3D pictures (hereinafter referred to as "3D video data") and audio data corresponding to the 3D video data. The 3D video data includes image data of a left-eye image and image data of a right-eye image. The content data also includes, as additional information (meta data), parameters of viewing environments intended by a content creator of 3D content (such parameters are hereinafter referred to as the "intended viewing environment parameters").

In embodiments of the present invention, viewing environment parameters include three types of parameters, i.e., the inter-eye distance of a user, the viewing distance between the user and a display unit, and the display size of the display unit on which 3D pictures are displayed.

The video encoder 11 of the recording apparatus 10 encodes 3D video data input from an external source according to an encoding method, such as a moving picture experts group phase 2 (MPEG2), an MPEG4, or an advanced video coding (AVC) method. The video encoder 11 supplies a video stream, which is an elementary stream (ES), obtained by encoding the 3D video data to the multiplexer 13.

The audio encoder 12 encodes audio data corresponding to the 3D video data input from an external source according to an encoding method, such as an MPEG method, and supplies an audio stream, which is an ES, obtained by encoding the audio data to the multiplexer 13.

The multiplexer 13 combines the video stream supplied from the video encoder 11 with the audio stream supplied from the audio encoder 12, and supplies a multiplexed stream to the recording controller 14.

The recording controller 14 records the multiplexed stream supplied from the multiplexer 13 on the recording medium 20. The recording controller 14 also records intended viewing environment parameters input from an operation input unit (not shown) on the recording medium 20 as a definition file.

In the recording apparatus 10 configured as described above, intended viewing environment parameters, as well as 3D content data, are recorded on the recording medium 20 as additional information (meta data). This makes it possible for a playback apparatus to perform processing for correcting the content data for a difference between intended viewing environment parameters and actual viewing environment parameters when playing back the content data.

Figure 2:
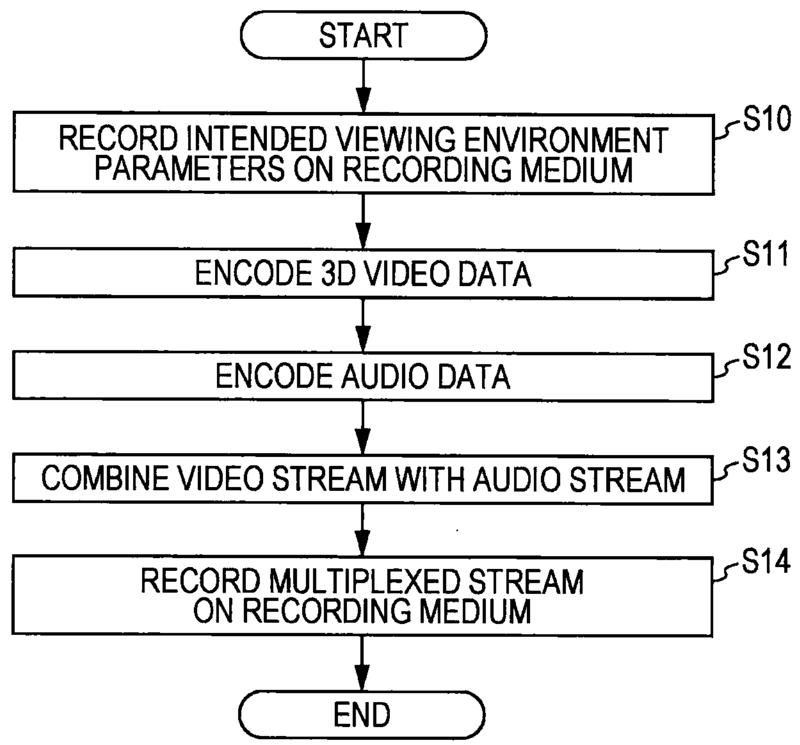
FIG. 2 is a flowchart illustrating a recording operation performed by the recording apparatus shown in FIG. 1.

FIG. 2 is a flowchart illustrating a recording operation performed by the recording apparatus 10 shown in FIG. 1. This recording operation is started, for example, when additional information, 3D video data, and audio data are input.

In step S10, the recording controller 14 records intended viewing environment parameters, which serve as additional information, input from an operation input unit on the recording medium 20 as a definition file. More specifically, three types of values, such as the inter-eye distance, the viewing distance, and the display size, intended by a content creator are recorded on the recording medium 20 as the definition file.

In step S11, the video encoder 11 encodes 3D video data input from an external source according to an MPEG method, such as MPEG2, MPEG4, or AVC. The video encoder 11 then supplies a video stream obtained by encoding the 3D video data to the multiplexer 13.

In step S12, the audio encoder 12 encodes audio data, which is input from an external source, corresponding to the 3D video data according to an encoding method, such as MPEG. The audio encoder 12 then supplies an audio stream obtained by encoding the audio data to the multiplexer 13.

In step S13, the multiplexer 13 combines the video stream supplied from the video encoder 11 with the audio stream supplied from the audio encoder 12. The multiplexer 13 then supplies the resulting multiplexed stream to the recording controller 14.

In step S14, the recording controller 14 records the multiplexed stream supplied from the multiplexer 13 on the recording medium 20. The operation is then completed.

Figure 3:
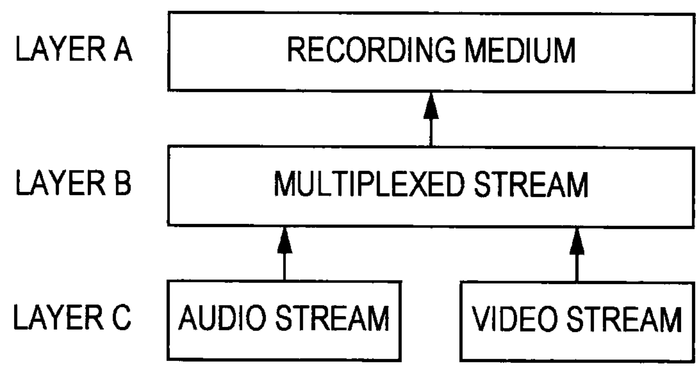
FIG. 3 illustrates a hierarchical structure of data recorded on a recording medium.

FIG. 3 illustrates a hierarchical structure of data to be recorded on the recording medium 20.

The hierarchy of data recorded on the recording medium 20 includes, as shown in FIG. 3, layer A, layer B, and layer C. The layer C contains ESs, such as an audio stream and a video stream. The layer B is a system layer having a multiplexed stream. The layer A contains information, which is the sole information recorded on the recording medium 20.

As described above, the intended viewing environment parameters, which serve as additional information, are recorded on the layer A as the sole definition file. However, the intended viewing environment parameters may be recorded on the layer B or the layer C.

If additional information is recorded, for example, on the layer C, it is recorded as follows. If the encoding method is AVC, additional information is recorded as supplemental enhancement information (SEI) or as part of a sequence parameter set (SPS) or a picture parameter set (PPS). If the encoding method is MPEG2, additional information is recorded as a video sequence or extension and user data (extension_and_user_data).

In this case, additional information may be variable within one video stream. Additionally, even if a plurality of 3D picture video streams having different intended viewing environment parameters are recorded on the recording medium 20, each intended viewing environment parameter can be supplied to a playback apparatus.

If additional information is recorded on the layer B, it is recorded on, for example, a private packet of a transport stream (TS), a private pack of a program stream (PS), or an extended partition of a box contained in MPEG4 configuration information.

The extended partition of an MEPG4 box on which additional information is recorded is provided in a private extension box (shown as "uuid" in FIG. 4) immediately after a ftyp box, which is positioned at the head of a file. In this case, a playback apparatus that plays back 3D video data recorded on the recording medium 20 can obtain intended viewing environment parameters before performing decoding. However, the intended viewing environment parameters are invariable within the file.

In the private extension box, in addition to intended viewing environment parameters, the type of codec, the bit rate, the frame size, the aspect ratio, information concerning whether an image is a 2D picture or a 3D picture, and so on, are recorded.

Figure 5:
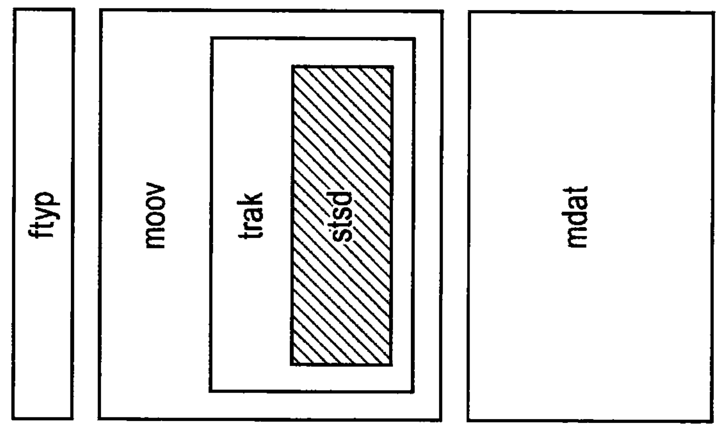
FIG. 5 illustrates another example of an extended partition in an MPEG4 box.

The extended partition of the MPEG4 box may be provided, as shown in FIG. 5, in a partition (shown as "stsd" in FIG. 5) of track information (shown as "trak" in FIG. 5) within a moov box. In this case, information indicating in which partition additional information is recorded is contained in a video stream. Based on this information, a playback apparatus obtains intended viewing environment parameters. In this case, therefore, the intended viewing environment parameters are variable within the video stream. However, the accessibility is poorer than that of a case where intended viewing environment parameters are recorded as shown in FIG. 4.

Figure 6:
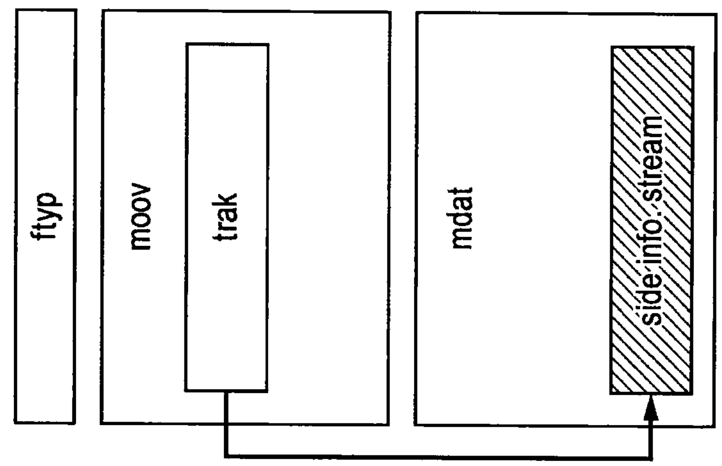
FIG. 6 illustrates still another example of an extended partition in an MPEG4 box.

Alternatively, the extended partition of the MPEG4 box may be provided in an mdat box, as shown in FIG. 6. That is, additional information may be recorded as one media stream (side info.stream). In this case, a video stream and additional information are synchronized with each other in accordance with time information, and thus, intended viewing environment parameters can be changed every moment.

Figure 4:
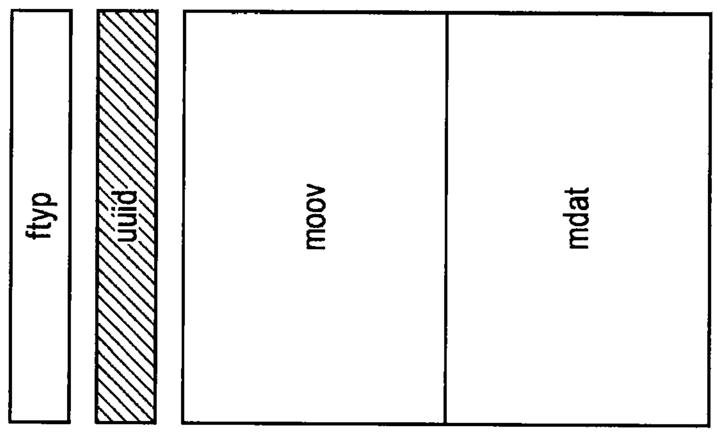
FIG. 4 illustrates an example of an extended partition in a moving picture experts group phase 4 (MPEG4) box.

In the examples shown in FIGS. 4 through 6, after the ftyp box, the moov box and the mdat box are disposed in this order. However, the arrangement of the moov box and the mdat box is not restricted to this.

2. Example of Overall Configuration Playback Apparatus

Figure 7:
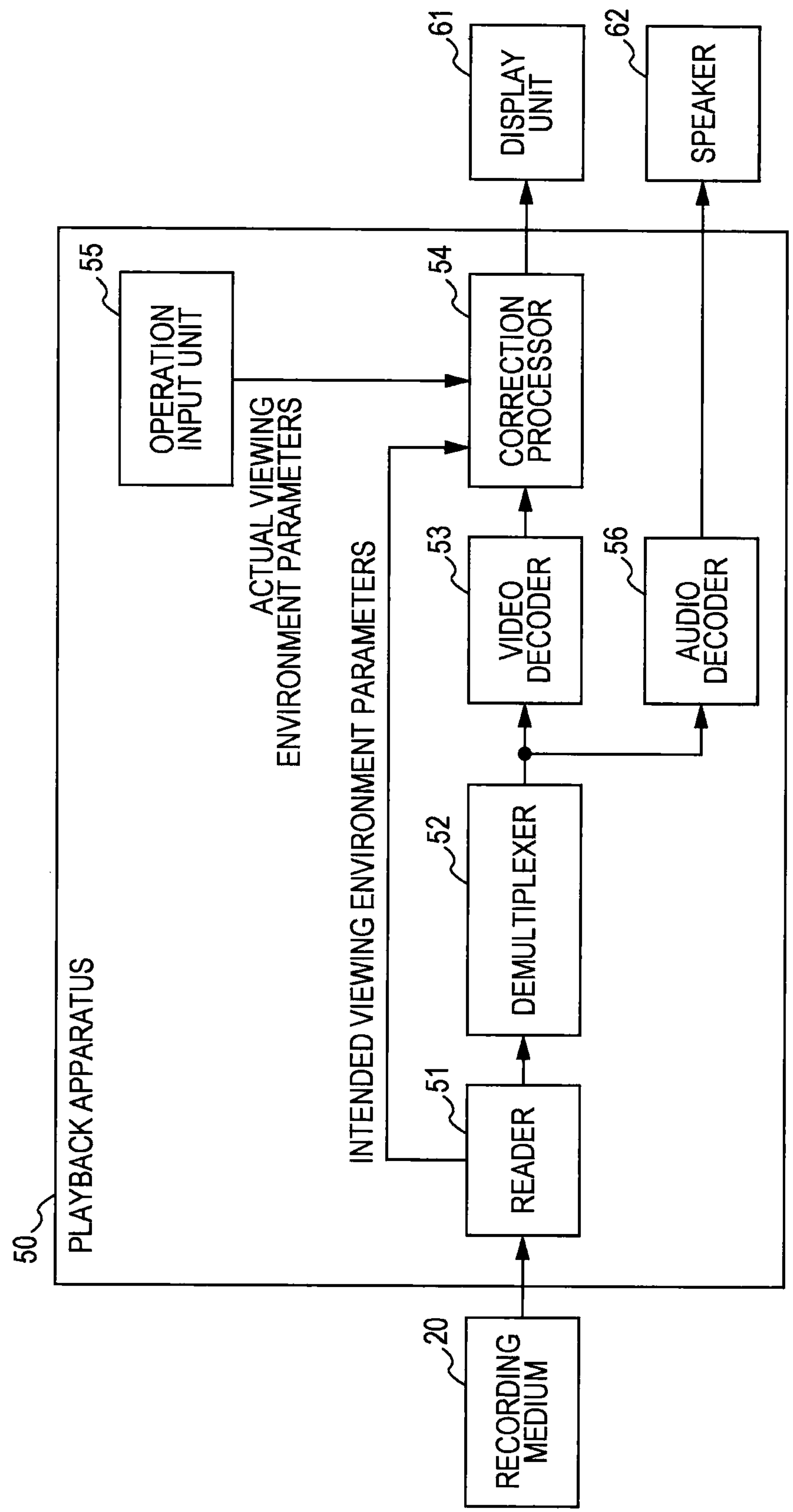
FIG. 7 is a block diagram illustrating an example of the configuration of a playback apparatus according to an embodiment of the present invention.

FIG. 7 is a block diagram illustrating an example of the configuration of a playback apparatus 50 according to an embodiment of the present invention.

The playback apparatus 50 shown in FIG. 7 includes a reader 51, a demultiplexer 52, a video decoder 53, a correction processor 54, an operation input unit 55, and an audio decoder 56. The playback apparatus 50 plays back, together with additional information, 3D video data and corresponding audio data recorded on the recording medium 20, and suitably displays 3D pictures on the basis of the additional information.

More specifically, the reader 51 of the playback apparatus 50 reads intended viewing environment parameters recorded on the recording medium 20 as additional information, and supplies the intended viewing environment parameters to the correction processor 54. The reader 51 also reads a multiplexed stream recorded on the recording medium 20, and supplies the multiplexed stream to the demultiplexer 52.

The demultiplexer 52 separates the multiplexed stream supplied from the reader 51 into a video stream and an audio stream. The demultiplexer 52 supplies the video stream to the video decoder 53 and also supplies the audio stream to the audio decoder 56.

The video decoder 53 decodes the video stream supplied from the demultiplexer 52 according to a method corresponding to the encoding method used in the video encoder 11 shown in FIG. 1, and supplies the resulting 3D video data to the correction processor 54.

The correction processor 54 performs 3D picture correction processing for correcting the 3D video data supplied from the video decoder 53 in accordance with the difference between the intended viewing environment parameters supplied from the reader 51 and actual viewing environment parameters supplied from the operation input unit 55. Then, the correction processor 54 outputs the corrected 3D video data, i.e., left-eye image data and right-eye image data, to a display unit 61.

The operation input unit 55 receives an input of actual viewing environment parameters from a user who views 3D pictures. The user inputs the actual viewing environments by using the operation input unit 55. More specifically, three types of values, such as the inter-eye distance, the viewing distance, and the display size, similar to those of the intended viewing environment parameters, are input by the user. The operation input unit 55 supplies the actual viewing environment parameters input by the user to the correction processor 54.

The audio decoder 56 decodes the audio stream supplied from the demultiplexer 52 according to a method corresponding to the encoding method used in the audio encoder 12 shown in FIG. 1, and supplies the resulting audio data to a speaker 62.

The display unit 61 displays a left-eye image and a right-eye image corresponding to the 3D video data supplied from the correction processor 54, for example, in a time-division multiplexing manner. In this case, a viewer wears, for example, shutter glasses that synchronize with the switching of the left-eye image and the right-eye image, and observes the left-eye image only with the left eye and observes the right-eye image only with the right eye. This makes it possible for the user to perceive 3D pictures three-dimensionally.

The speaker 62 outputs sound corresponding to the audio data supplied from the audio decoder 56.

Figure 8:
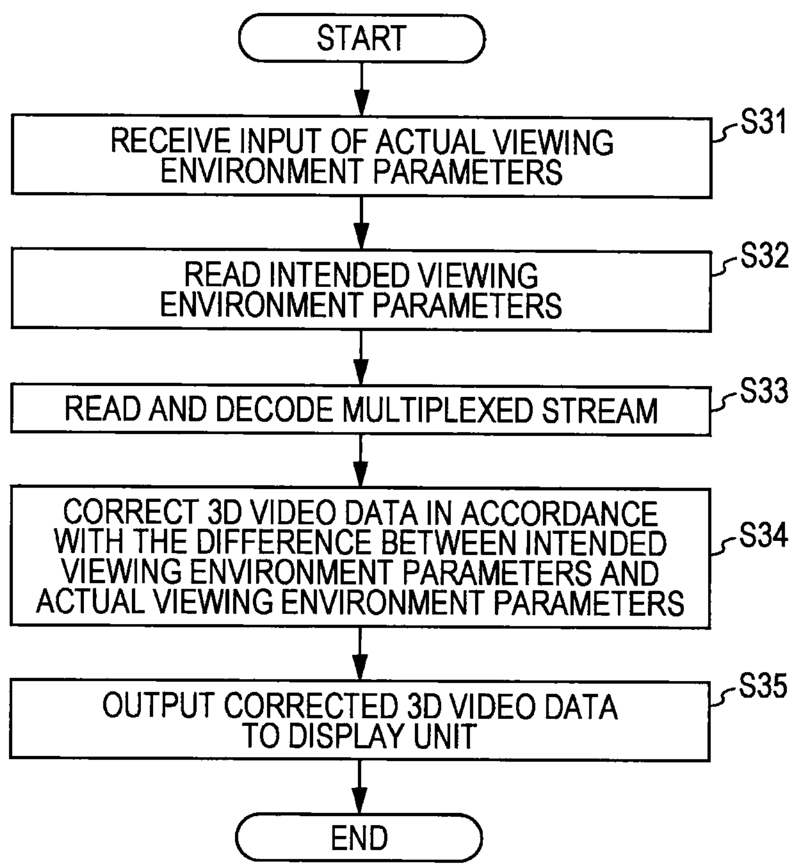
FIG. 8 is a flowchart illustrating a playback operation performed by the playback apparatus shown in FIG. 7.

FIG. 8 is a flowchart illustrating a playback operation performed by the playback apparatus 50. This playback operation is started, for example, when an instruction to play back 3D content recorded on the recording medium 20 is given by a user.

In step S31, the operation input unit 55 receives an input of actual viewing environment parameters from a user who views 3D pictures, and supplies the received actual viewing environment parameters to the correction processor 54. Step S31 may be executed in advance separately from the following steps. That is, actual viewing environment parameters may be input in advance, for example, on a setting screen, before an instruction to play back 3D content is given.

In step S32, the reader 51 reads intended viewing environment parameters recorded on the recording medium 20 as additional information, and supplies the intended viewing environment parameters to the correction processor 54.

In step S33, the playback apparatus 50 reads a multiplexed stream of 3D content recorded on the recording medium 20 and decodes the multiplexed stream. That is, the reader 51 reads the multiplexed stream of the 3D content from the recording medium 20, and supplies the multiplexed stream to the demultiplexer 52. The demultiplexer 52 separates the multiplexed stream into a video stream and an audio stream. The video decoder 53 decodes the video stream according to a method corresponding to the encoding method used in the recording apparatus 10 and supplies the resulting 3D video data to the correction processor 54. The audio decoder 56 decodes the audio stream according to a method corresponding to the encoding method used in the recording apparatus 10 and supplies the resulting audio data to the speaker 62.

In step S34, the correction processor 54 performs 3D picture correction processing for correcting the supplied 3D video data in accordance with the difference between the intended viewing environment parameters supplied from the reader 51 and the actual viewing environment parameters supplied from the operation input unit 55. The correction processing includes first correction processing and second correction processing. Details of the first and second correction processing are discussed later.

In step S35, the correction processor 54 outputs the corrected 3D video data, i.e., the image data of the left-eye image and the right-eye image, to the display unit 61. Also in step S35, the audio decoder 56 outputs the audio data corresponding to the corrected 3D video data to the speaker 62. When the 3D content pictures and sound to be played back are entirely output, the playback operation is completed.

As described above, the playback apparatus 50 corrects for the difference between viewing environments intended by a content creator and actual viewing environments input by a user, thereby making it possible to provide 3D pictures without distortions, which would otherwise be caused by the difference of viewing environments.

Details of 3D picture correction processing performed by the correction processor 54 are given below. In the playback apparatus 50, a first configuration of the correction processor 54 shown in FIG. 9 or a second configuration of the correction processor 54 shown in FIG. 23 may be taken.

3. First Example of Correction Processor of Playback Apparatus

FIG. 9 is a block diagram illustrating an example of a first configuration of the correction processor 54.

The correction processor 54 shown in FIG. 9 includes a parallax control parameter calculator 81 and a parallax controller 82. The parallax controller 82 includes a parallax detector 91, a virtual inter-camera distance image generator 92, and an image scaling unit 93.

Intended viewing environment parameters input from the reader 51 and actual viewing environment parameters input from the operation input unit 55 are supplied to the parallax control parameter calculator 81. The parallax control parameter calculator 81 calculates two parallax control parameters, such as a virtual inter-camera distance and an amount by which images are scaled (such an amount is hereinafter referred to as the "image scaling amount"), in accordance with the difference between the intended viewing environment parameters and the actual viewing environment parameters.

Among the viewing environment parameters, if the viewing distance is different between the intended viewing environment parameters and the actual viewing environment parameters, the virtual inter-camera distance can be controlled (changed) so that distortions of a 3D picture are corrected. This is described in detail below.

If the inter-eye distance or the display size is different between the intended viewing environment parameters and the actual viewing environment parameters, one of or both the virtual inter-camera distance and the image scaling amount can be controlled (changed) so that distortions of a 3D picture are corrected. If both the virtual inter-camera distance and the image scaling amount are used, the control ratio of the virtual inter-camera distance to the image scaling amount is determined. Then, in accordance with the determined control ratio, parallax control parameters corresponding to the amount of correction made by using the virtual inter-camera distance and the amount of correction made by using the image scaling amount are calculated. The control ratio of the virtual inter-camera distance to the image scaling amount may be stored in the correction processor 54 as a fixed value, or may be input from, for example, the operation input unit 55.

The parallax detector 91 detects the amount of parallax between the left-eye image and the right-eye image of the 3D video data supplied from the video decoder 53 (FIG. 7), and more specifically, the parallax decoder 91 detects the amount of parallax between each pixel of the left-eye image and the corresponding pixel of the right-eye image by using, for example, a block matching method. The parallax detector 91 creates a parallax map by setting the amounts of parallax of corresponding pixels between the left-eye image and the right-eye image as luminance levels, and supplies the parallax map to the virtual inter-camera distance image generator 92. It is not necessary that the amounts of parallax be represented by a parallax map, and the amounts of parallax may be shown in any form as long as the virtual inter-camera distance image generator 92 can identify the detected amounts of parallax.

A left-eye image and a right-eye image, which form an original image (before being corrected) captured with a predetermined inter-camera distance, are supplied to the virtual inter-camera distance image generator 92 from the video decoder 53 (FIG. 7). The amount of parallax between each pixel of the original left-eye image and the corresponding pixel of the original right-eye image is supplied to the virtual inter-camera distance image generator 92 from the parallax detector 91 as a parallax map. The virtual inter-camera distance image generator 92 generates a left-eye image and a right-eye image that would be captured with a virtual inter-camera distance. That is, the virtual inter-camera distance image generator 92 generates an image that would be captured with the virtual inter-camera distance (such an image is hereinafter referred to as the "virtual inter-camera distance image") supplied from the parallax control parameter calculator 81 by using the original left-eye image, the original right-eye image, and the amounts of parallax between the left-eye image and the right-eye image.

The virtual inter-camera distance supplied from the parallax control parameter calculator 81 is expressed by the ratio of the virtual inter-camera distance to the original inter-camera distance. For example, as shown in FIG. 10, assuming that the inter-camera distance used when the original left-eye image and the right-eye image are captured is 1, the camera position for the original left-eye image is set to be 0.0, and the camera position for the original right-eye image is set to be 1.0.

Figure 10:
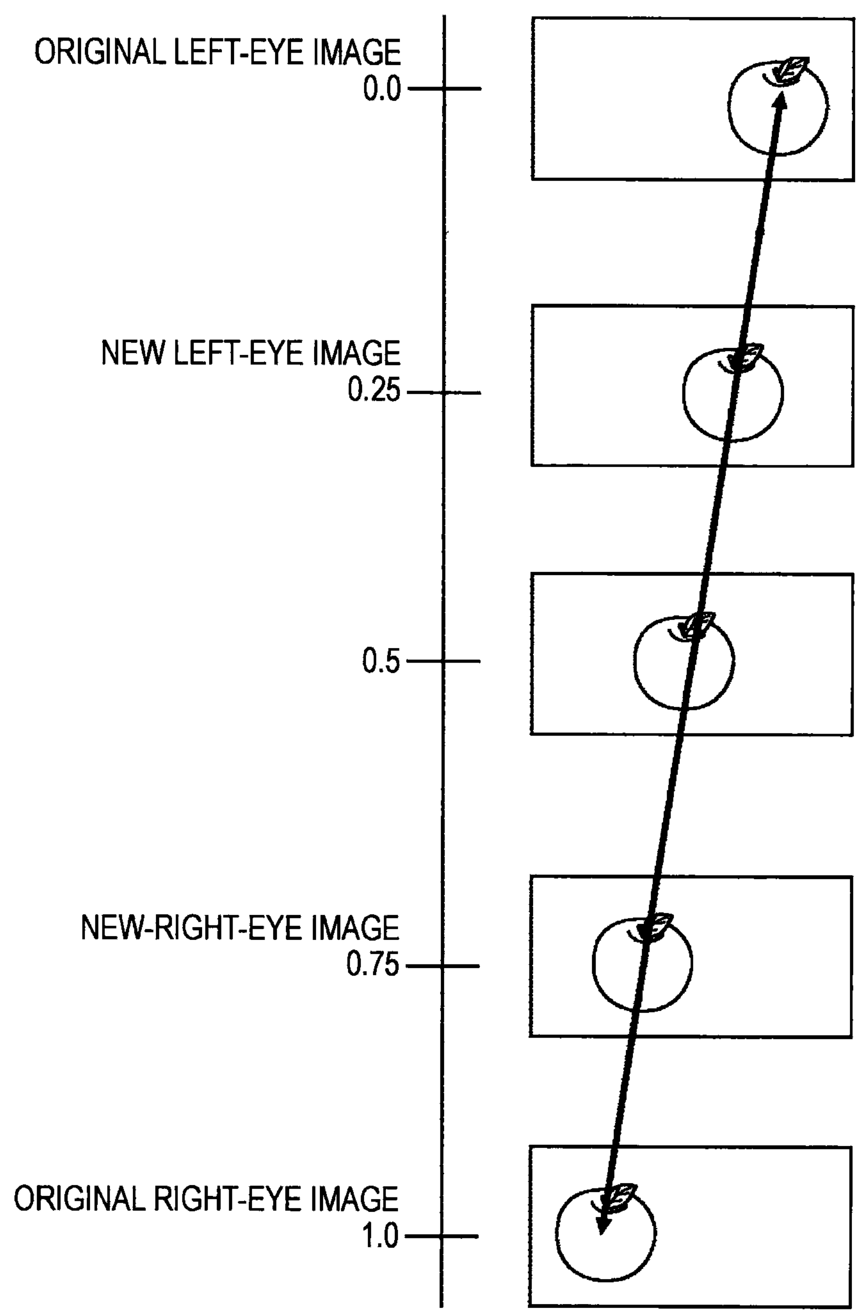
FIG. 10 illustrates generation of a virtual inter-camera distance image.

When a virtual inter-camera distance of 0.5 is supplied from the parallax control parameter calculator 81, the virtual inter-camera distance image generator 92 generates, as shown in FIG. 10, a left-eye image having a virtual camera position of 0.25 and a right-eye image having a virtual camera position of 0.75. In this case, the ratio of the inter-camera distance for the generated left-eye image and right-eye image to the original inter-camera distance is 0.5.

Figure 11:
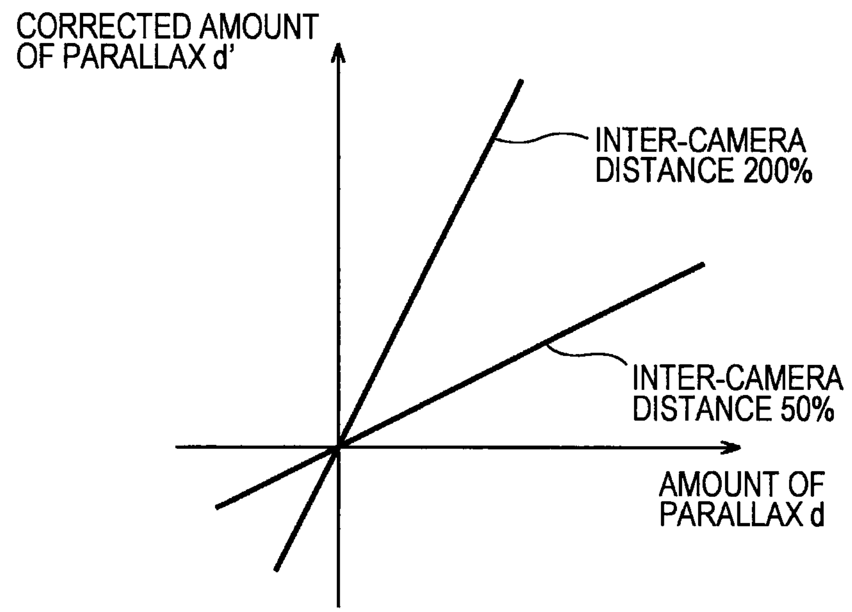
FIG. 11 illustrates a change in the amount of parallax when the inter-camera distance is changed.

FIG. 11 illustrates a change in the amount of parallax when the inter-camera distance is changed. The positive sides of the coordinates indicate the pop-out direction (forward direction, i.e., toward the viewer) of pictures, while the negative sides of the coordinates indicate the receding direction (backward direction, i.e., away from the viewer) of pictures.

When the inter-camera distance is reduced to 50% (0.5) of the original inter-camera distance, the amount of parallax is also reduced to ½ the amount of parallax before being corrected. When the inter-camera distance is increased to 200% (2.0) of the original inter-camera distance, the amount of parallax is also doubled.

Referring back to FIG. 9, the image scaling unit 93 scales a left-eye image and a right-eye image supplied from the virtual inter-camera distance image generator 92 in accordance with the image scaling amount supplied from the parallax control parameter calculator 81. The image scaling amount supplied from the parallax control parameter calculator 81 is expressed by the ratio of the image scaling amount to the original image scaling amount. The image scaling unit 93 then outputs the image data of the left-eye image and the right-eye image after being scaled to the display unit 61 (FIG. 7).

Figure 12:
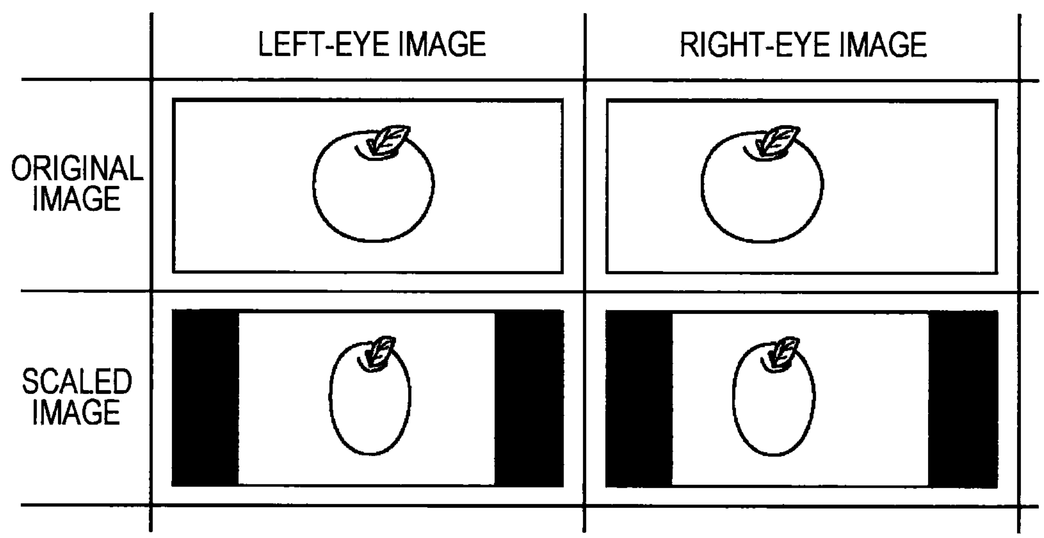
FIG. 12 illustrates left-eye images and right-eye images before and after being subjected to scaling processing.

FIG. 12 illustrates left-eye images and right-eye images before and after being subjected to scaling processing.

In FIG. 12, the left-eye image and the right-eye image before being scaled, illustrated as the original images, are corrected with a scaling amount (scaling ratio) of 0.5 in the direction in which parallax occurs, i.e., in the horizontal direction. The resulting left-eye image and right-eye image are shown as the scaled images.

Figure 13:
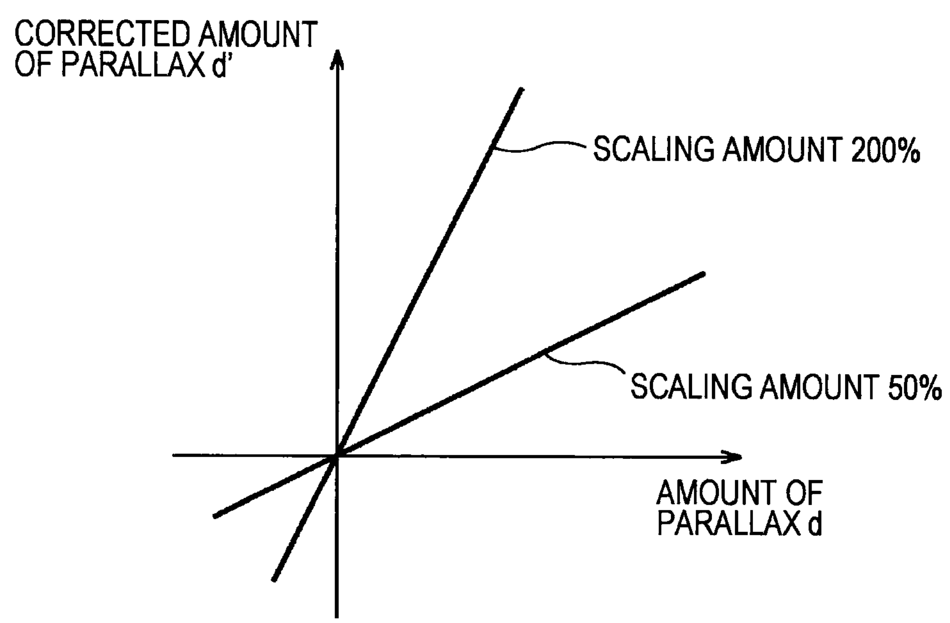
FIG. 13 illustrates a change in the amount of parallax when the image scaling amount is changed.

FIG. 13 illustrates a change in the amount of parallax when the scaling amount is changed.

When the scaling amount is reduced to 50% (0.5) of the original scaling amount, the amount of parallax is also reduced to ½ the amount of parallax before being corrected. When the scaling amount is increased to 200% (2.0) of the original scaling amount, the amount of parallax is also doubled.

A description is given below of the relationship between a change in the depth and a change in each of the viewing environment parameters, such as the viewing distance, the inter-eye distance, and the display size.

Figure 14:
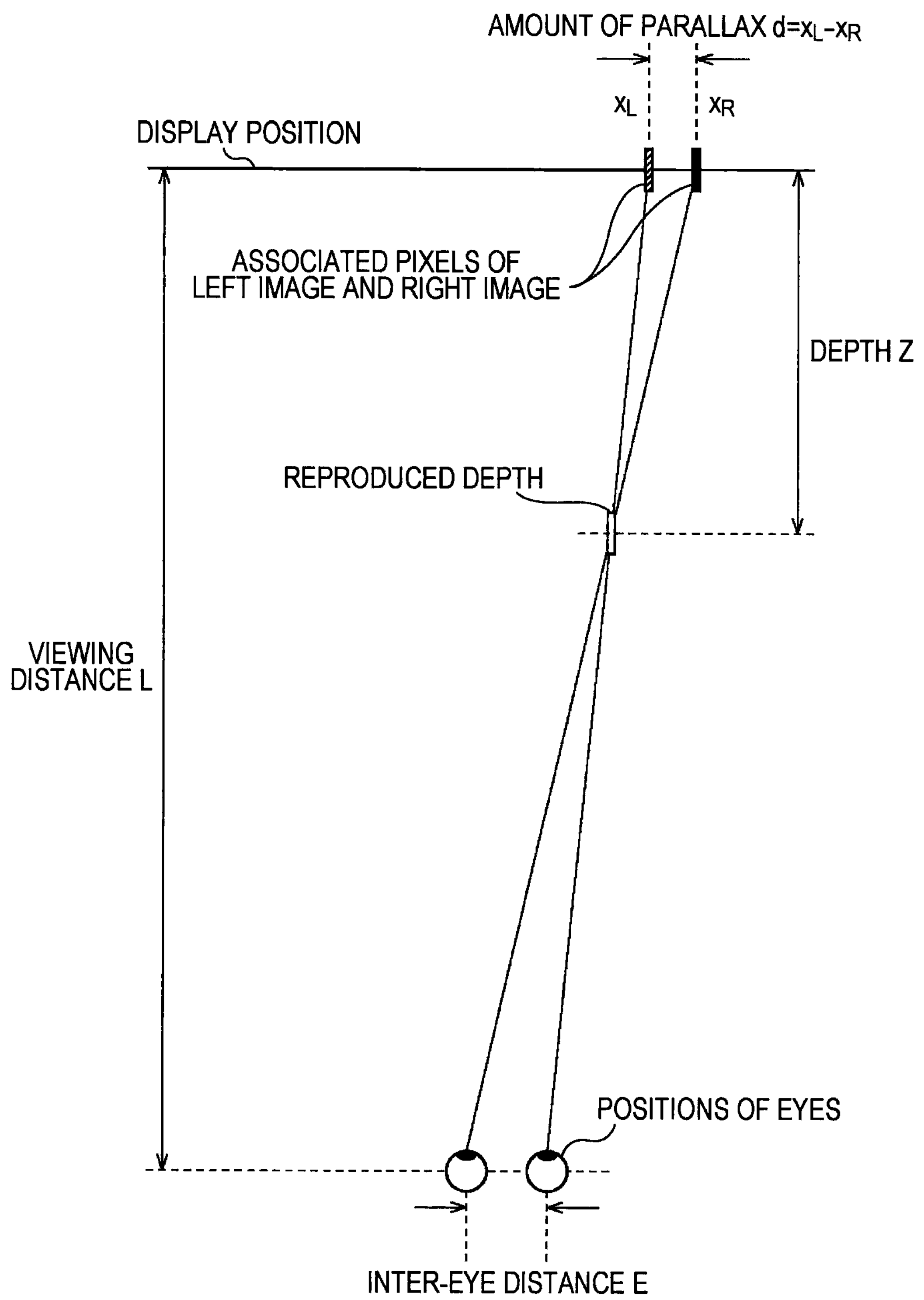
FIG. 14 illustrates variables necessary for determining the relationship between the depth and each of the viewing environment parameters.

Variables necessary for determining the relationship between the depth and each of the viewing environment parameters are defined with reference to FIG. 14.

It is now assumed that the inter-eye distance of a user viewing 3D pictures is designated by E and that the distance from the user to a display unit which displays 3D pictures (such a distance is referred to as the "viewing distance") is indicated by L. It is now assumed that, in the 3D picture viewed by the user, a pixel $x_L$ at one position of the left-eye image corresponds to a pixel $x_R$ at the associated position of the right-eye image. That is, the user views a 3D picture with an amount of parallax $d=(x_L-x_R)$. In this case, the depth reproduced on the user's retina is represented by Z.

In this case, considering the relationship between the depth Z and the amount of parallax d, Z can be expressed by equation (1):

$$E/(L-Z)=d/Z$$

$$Z=L\cdot d/(E+d) \quad (1)$$

where, throughout the specification and the drawings, "·" in equations means multiplication.

The relationship between the viewing distance L and the depth Z is as follows.

The depth Za when the viewing distance is changed to the viewing distance L', which is changed from the original viewing distance L by a factor S, i.e., L'=S·L, is now considered.

From equation (1), Za=L'·d/(E+d) holds true. Since L'=S·L, equation (2) is established.

$$Za=S\cdot L\cdot d/(E+d) \quad (2)$$

Equation (2) can be expressed by equation (3).

$$Za=S\cdot Z \quad (3)$$

Accordingly, when the viewing distance is changed by a factor S, the depth (pop-out or receding amount) Za is also changed from the original depth Z by a factor S.

The relationship between the display size and the depth Z is as follows.

When the display size is changed from the original display size by a factor S, the amount of parallax d' is also changed by a factor S (d'=S·d). From equation (1), the depth Zb when the amount of parallax d'=S·d can be expressed by Zb=L·d'/(E+d'). Since d'=S·d, equation (4) holds true.

$$Zb=L\cdot S\cdot d/(E+S\cdot d) \quad (4)$$

By eliminating d in equation (4) by using equation (1), the following equation (5) is established.

$$Zb=L\cdot S\cdot Z/(L-Z+S\cdot Z) \quad (5)$$

Accordingly, when the display size is changed from the original display size by a factor S, the depth Zb is nonlinear with respect to the original depth Z, as expressed by equation (5).

The relationship between the depth Z and the inter-eye distance is as follows.

The depth Zc when the inter-eye distance is changed from the original inter-eye distance E by a factor S (E'=S·E) is now considered. From equation (1), Zc=L·d/(E'+d) holds true. Since E'=S·E, equation (6) can be established.

$$Zc=L\cdot d/(S\cdot E+d) \quad (6)$$

By eliminating d in equation (6) by using equation (1), the following equation (7) holds true.

$$Zc=L\cdot Z/(S\cdot L-S\cdot Z+Z) \quad (7)$$

Accordingly, when the inter-eye distance is changed from the original inter-eye distance E by a factor S, the depth Zc is nonlinear with respect to the original depth Z, as expressed by equation (7).

Figure 15:
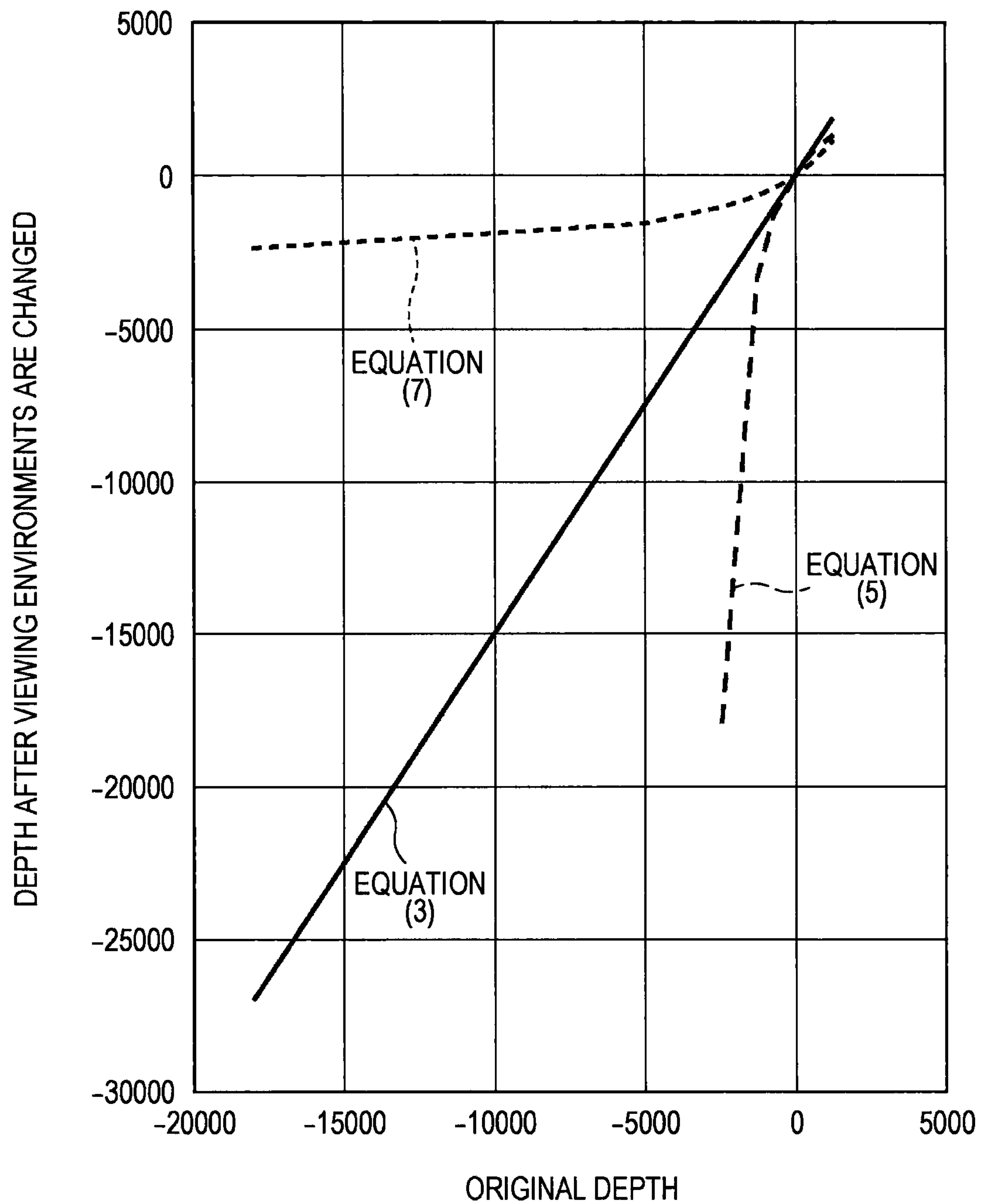
FIG. 15 illustrates the relationships of the changed depths Za, Zb, Zc, respectively, to the original depth Z when each of the viewing environment parameters is changed.

FIG. 15 illustrates examples of equations (3), (5), and (7) expressing the relationships of the changed depths Za, Zb, Zc, respectively, with respect to the original depth Z when the viewing distance, the display size, and the inter-eye distance are changed.

In FIG. 15, the original viewing environment parameters are as follows: the viewing distance L is 1500 mm; the display size is 42 inches; and the inter-eye distance E is 65 mm.

Equation (3) in FIG. 15 represents the relationship of the changed depth Za with respect to the original depth Z when the viewing distance L is increased to 2250 mm.

Equation (5) in FIG. 15 represents the relationship of the changed depth Zb with respect to the original depth Z when the display size is increased to 63 inches.

Equation (7) in FIG. 15 represents the relationship of the changed depth Zc with respect to the original depth Z when the inter-eye distance E is increased to 97.5 mm.

A description is now given of the amounts of correction, i.e., the virtual inter-camera distance and the image scaling amount, in consideration of the above-described relationship between change in depth and change in viewing environment parameters.

The amount of correction when the viewing distance is changed by a factor S, i.e., L'=S·L is first described.

Assuming that the depth Za when the viewing distance L is changed to the viewing distance L' is indicated by Z', equation (2) can be expressed by equation (8).

$$Z'(d)=S\cdot L\cdot d/(E+d) \tag{8}$$

The equation for correcting the amount of parallax d that makes the changed depth Z' be the same as the original depth Z is considered. Assuming that the corrected amount of parallax is designated by d', equation (9) is defined as follows.

$$d'=f(d) \tag{9}$$

By changing the amount of parallax d in equation (8), equation (10) is obtained.

$$Z'(d')=S\cdot L\cdot d'/(E+d') \tag{10}$$

Considering the equation d'=f(d) that makes the changed depth Z' be the same as the original depth Z, since Z=Z', equations (11) are established.

$$Z=Z'$$

$$L'\cdot d/(E+d)=S\cdot L\cdot d'/(E+d')$$

$$S\cdot d'\cdot(E+d)=d\cdot(E+d')$$

$$d'\cdot(S\cdot E+S\cdot d-d)=d\cdot E$$

$$d'=d\cdot E/(S\cdot E+S\cdot d-d) \tag{11}$$

Accordingly, when the viewing distance is changed from the original viewing distance by a factor S, to cancel such a change in the viewing distance, the amount of parallax is changed to the amount of parallax d' obtained by nonlinear equations (11).

Figure 16:
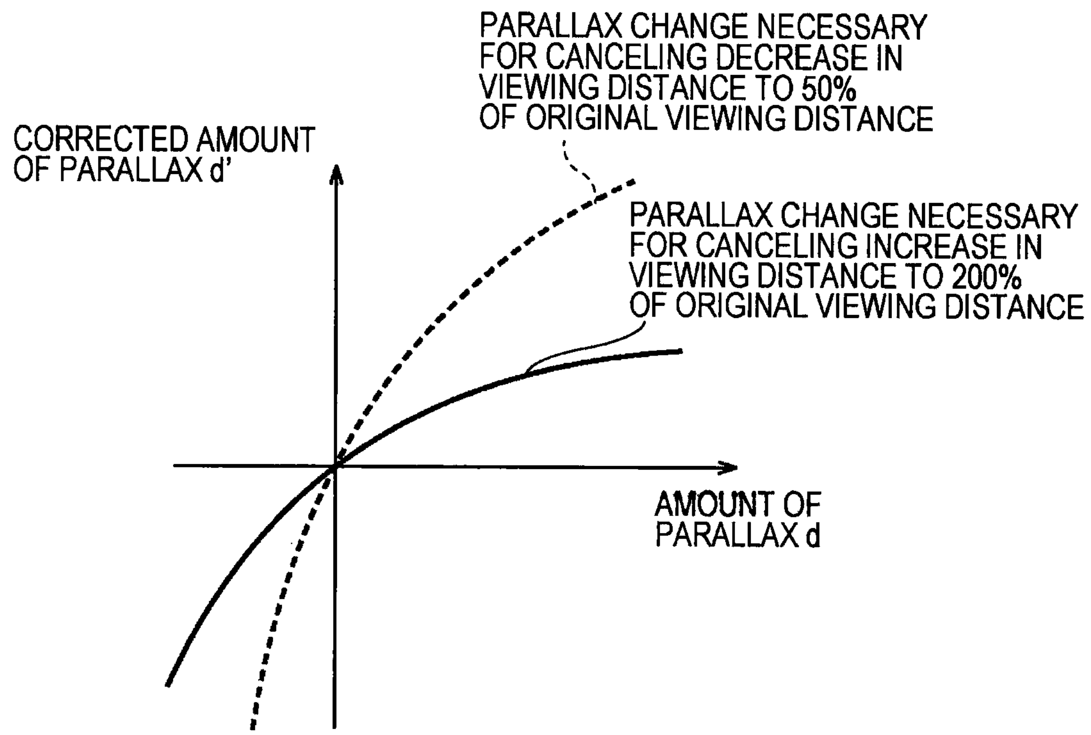
FIG. 16 illustrates the amount of correction when the viewing distance is changed.

FIG. 16 illustrates equations (11) in a conceptual drawing when the viewing distance is changed (L'/L) to 200% and 50% of the original viewing distance.

In this embodiment, the virtual inter-camera distance is given as a parallax control parameter. Accordingly, when the viewing distance is changed from the original viewing distance by a factor S, in order to cancel such a change, the virtual inter-camera distance C(d) expressed by equation (12) is given as the amount of correction.

$$C(d)=d'/d \tag{12}$$

Figure 17A:
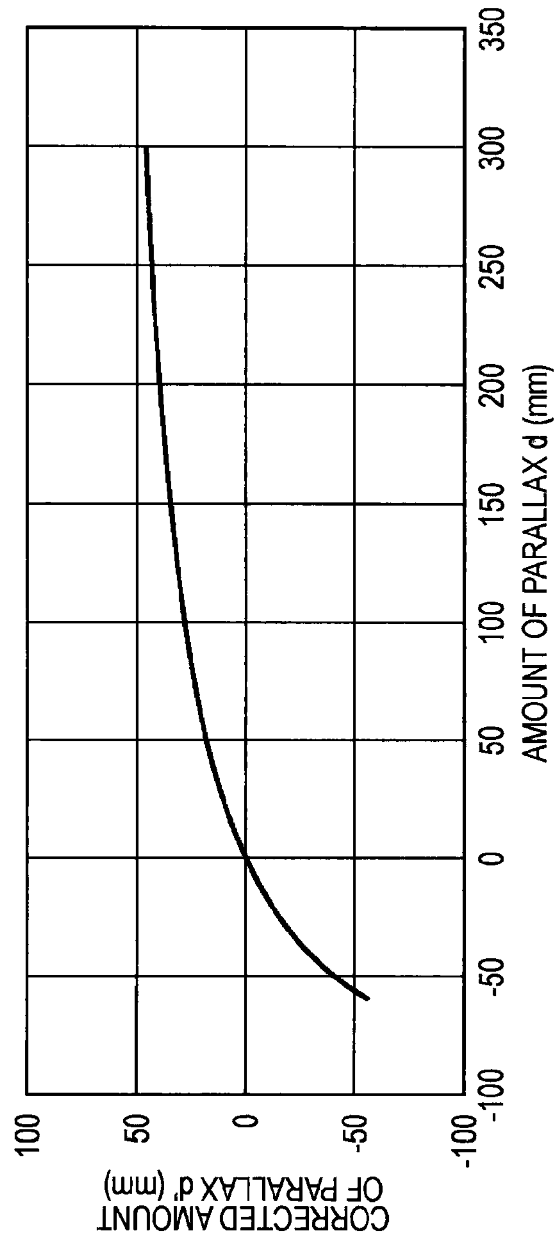
FIGS. 17A and 17B illustrate the amount of correction when the viewing distance is changed.

FIG. 17A illustrates equations (11) when the viewing distance L is doubled under the viewing environments in which the viewing distance L is 1500 mm, the display size is 42 inches, and the inter-eye distance E is 65 mm.

Figure 17B:
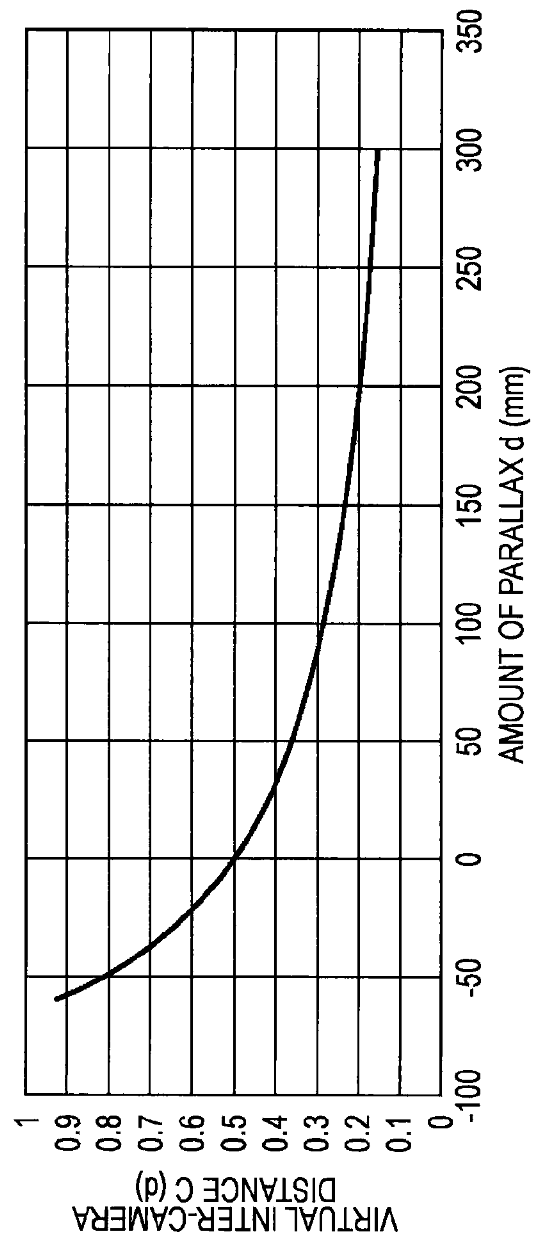

FIG. 17B illustrates equations (11) shown in FIG. 17A in the form of the virtual inter-camera distance expressed by equation (12) C(d)=d'/d.

The amount of correction when the display size is changed from the original display size by a factor S is discussed below.

When the display size is changed by a factor S, the amount of parallax is also changed by a factor S. Accordingly, the virtual inter-camera distance or the image scaling amount that changes the amount of parallax to 1/S the original amount of parallax is set as the amount of correction. For example, if the amount of parallax is increased to four times, the virtual inter-camera distance is reduced to 25% of the original virtual inter-camera distance or the image scaling amount is reduced to 25% of the original image scaling amount.

Alternatively, a combination of the virtual inter-camera distance and the image scaling amount may be set as the amount of correction. For example, if the control ratio of the virtual inter-camera distance to the image scaling amount is 50:50, a 3D image with a virtual inter-camera distance of 50% may be generated, and then, image scaling processing may be performed on the generated 3D image with an image scaling ratio of 50%.

The amount of correction when the inter-eye distance is changed by a factor S (E'=S·E) is discussed below.

As in the case of the viewing distance described above, assuming that the depth Zc when the inter-eye distance is changed to the inter-eye distance E' is indicated by Z', equation (6) can be expressed by equation (13).

$$Z'(d)=L\cdot d/(S\cdot E+d) \tag{13}$$

The equation for changing the amount of parallax d that makes the changed depth Z' be the same as the original depth Z is considered.

By changing the amount of parallax d in equation (13), equation (14) is obtained.

$$Z'(d')=L\cdot d'/(S\cdot E+d') \tag{14}$$

Considering the equation d'=f(d) that makes the changed depth Z' be the same as the original depth Z, equations (15) are established from equation (13) and equation (14).

$$Z=Z'$$

$$L\cdot d/(E+d)=L\cdot d'/(S\cdot E+d')$$

$$d'\cdot(E+d)=d\cdot(S\cdot E+d')$$

$$d'\cdot(E+d'\cdot d)=d\cdot S\cdot E+d\cdot d'$$

$$d'=S\cdot d \tag{15}$$

Accordingly, when the inter-eye distance is changed from the original inter-eye distance by a factor S, the amount of parallax is changed by a factor S, thereby canceling a change in the depth caused by a change in the inter-eye distance.

In the foregoing description, the viewing distance, the display size, and the inter-eye distance before being changed correspond to intended viewing environment parameters, while the viewing distance, the display size, and the inter-eye distance after being changed correspond to actual viewing environment parameters.

FIG. 18 illustrates a summary of processing for canceling a change in the depth, which is caused by the difference between intended viewing environment parameters and actual viewing environment parameters, such as the viewing distance, the display size, and the inter-eye distance.

In FIG. 18, the factor S that changes the viewing environment parameters is set to be 4 or ¼, i.e., the viewing distance, the display size, or the inter-eye distance is increased to four times or reduced to ¼ of the original viewing environment parameter.

In FIG. 18, when the amount of correction is a combination of the virtual inter-camera distance and the image scaling amount, the control ratio of the virtual inter-camera distance to the image scaling amount is 50:50.

In images obtained by controlling the virtual inter-camera distance, artifacts occur if the images have occlusion. In images obtained by controlling the image scaling amount, the aspect ratio is changed. Thus, by a combination of the virtual inter-camera distance control and the image scaling control, a change in the aspect ratio can be suppressed while reducing the occurrence of artifacts. In this case, when the image scaling amount and the virtual inter-camera distance are designated by Rs and Rc, respectively, and when the magnification of the necessary amount of parallax is represented by R', Rs and Rc that satisfy $R'=Rs\cdot Rc$ can be used.

Figure 19:
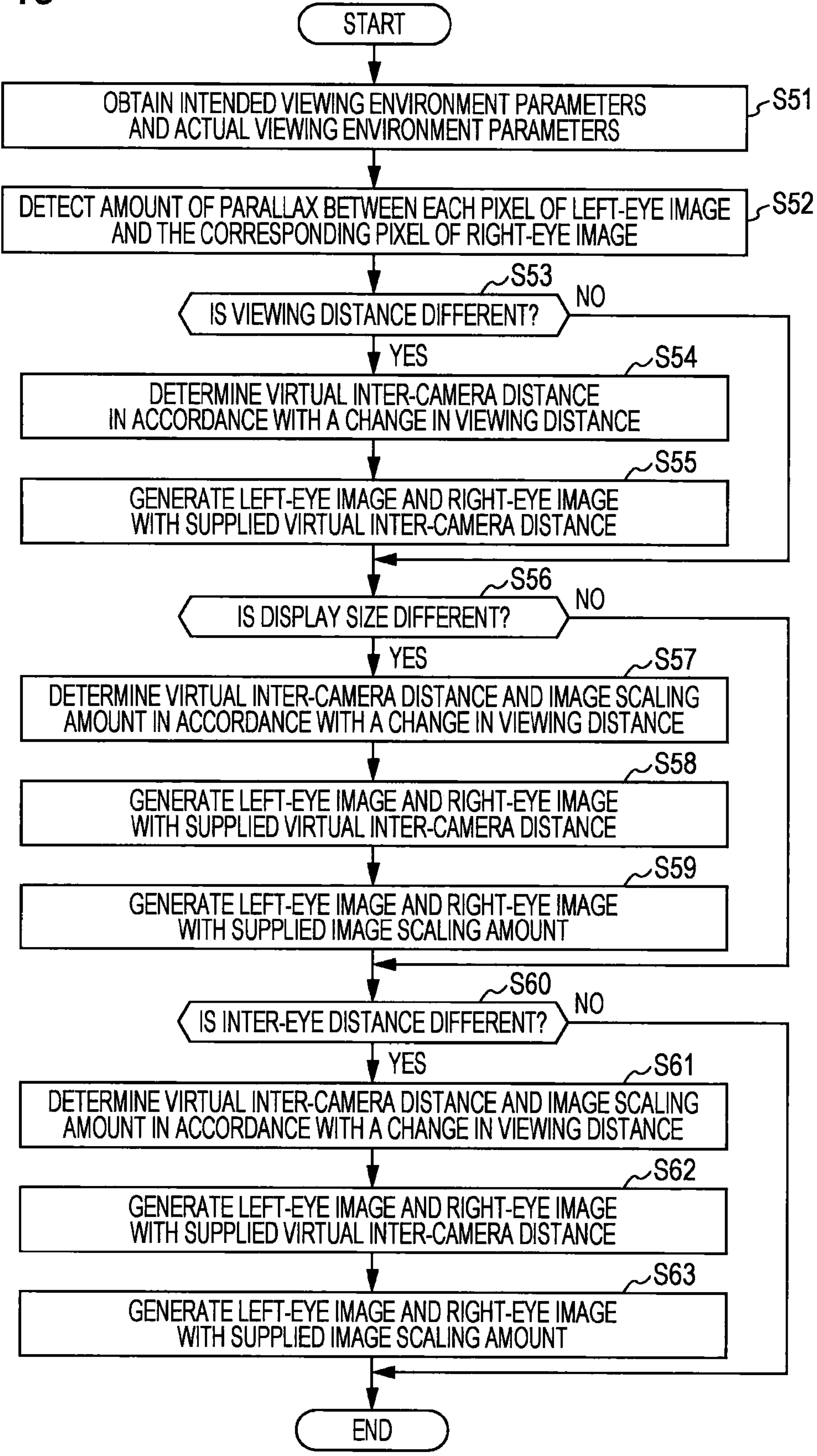
FIG. 19 is a flowchart illustrating correction processing performed by the correction processor having the first configuration.

A description is given in detail below, with reference to the flowchart of FIG. 19, of correction processing performed by the correction processor 54 having the first configuration described above, i.e., first correction processing in step S34 in FIG. 8.

In this embodiment, it is assumed that the control ratio of the virtual inter-camera distance to the image scaling amount is 50:50. Also for simple description, it is assumed that only one of the three viewing environment parameters, such as the viewing distance, the display size, and the inter-eye distance, is different between intended viewing environments and actual viewing environments.

In step S51, the parallax control parameter calculator 81 obtains intended viewing environment parameters supplied from the reader 51 and actual viewing environment parameters supplied from the operation input unit 55. The actual viewing environment parameters input into the operation input unit 55 may be stored in a predetermined storage unit in advance. In this case, the parallax control parameter calculator 81 may obtain the actual viewing environment parameters from the storage unit.

In step S52, the parallax detector 91 detects the amount of parallax between each pixel of a left-eye image and the corresponding pixel of a right-eye image supplied from the video decoder 53 according to, for example, a block matching method. The detected amounts of parallax of the corresponding pixels between the left-eye image and the right-eye image are supplied to the virtual inter-camera distance image generator 92 as, for example, a parallax map.

In step S53, the parallax control parameter calculator 81 compares the supplied intended viewing environment parameters with actual viewing environment parameters so as to determine whether the viewing distance is different. If it is determined in step S53 that the viewing distance is different, the process proceeds to step S54. In step S54, the parallax control parameter calculator 81 determines the virtual inter-camera distance in accordance with a change in the viewing distance. The virtual inter-camera distance is determined from equations (11) and equation (12). The viewing distance before being changed is that of the intended viewing environment parameter, while the viewing distance after being changed is that of the actual viewing environment parameter. The parallax control parameter calculator 81 supplies the determined virtual inter-camera distance to the virtual inter-camera distance image generator 92 as the parallax control parameter.

In step S55, the virtual inter-camera distance image generator 92 generates a left-eye image and a right-eye image captured with the virtual inter-camera distance supplied from the parallax control parameter calculator 81, and supplies the generated left-eye image and right-eye image to the image scaling unit 93. The image scaling unit 93 outputs the supplied left-eye image and right-eye image without changing them.

If it is determined in step S53 that the viewing distance is the same, steps S54 and S55 are skipped, and the process proceeds to step S56.

In step S56, the parallax control parameter calculator 81 compares the supplied intended viewing environment parameters with the supplied actual viewing environment parameters so as to determine whether the display size is different. If it is determined in step S56 that the display size is different, the process proceeds to step S57. In step S57, the parallax control parameter calculator 81 determines the virtual inter-camera distance and the image scaling amount in accordance with a change in the display size. Since the control ratio of the virtual inter-camera distance to the image scaling amount is 50:50, the parallax control parameter calculator 81 determines each of the virtual inter-camera distance and the image scaling amount used for correcting half the amount of change of parallax in accordance with a change in the display size. The parallax control parameter calculator 81 supplies the determined virtual inter-camera distance and the determined image scaling amount to the virtual inter-camera distance image generator 92 and the image scaling unit 93, respectively.

Then, in step S58, the virtual inter-camera distance image generator 92 generates a left-eye image and a right-eye image captured with the virtual inter-camera distance supplied from the parallax control parameter calculator 81, and supplies the generated left-eye image and right-eye image to the image scaling unit 93.

In step S59, the image scaling unit 93 generates a left-eye image and a right-eye image with the image scaling amount supplied from the parallax control parameter calculator 81, and outputs the generated left-eye image and right-eye image.

If it is determined in step S56 that the display size is the same, steps S57 through S59 are skipped, and the process proceeds to step S60.

In step S60, the parallax control parameter calculator 81 compares the supplied intended viewing environment parameters with the actual viewing environment parameters so as to determine whether the inter-eye distance is different. If it is determined in step S60 that the inter-eye distance is different, the process proceeds to step S61. In step S61, the parallax control parameter calculator 81 determines the virtual inter-camera distance and the image scaling amount in accordance with a change in the inter-eye distance. Since the control ratio of the virtual inter-camera distance to the image scaling amount is 50:50, the parallax control parameter calculator 81 determines each of the virtual inter-camera distance and the image scaling amount used for correcting half the amount of change of parallax in accordance with a change in the inter-eye distance. The parallax control parameter calculator 81 supplies the determined virtual inter-camera distance and the determined image scaling amount to the virtual inter-camera distance image generator 92 and the image scaling unit 93, respectively.

Then, in step S62, the virtual inter-camera distance image generator 92 generates a left-eye image and a right-eye image captured with the virtual inter-camera distance supplied from the parallax control parameter calculator 81, and supplies the generated left-eye image and right-eye image to the image scaling unit 93.

In step S63, the image scaling unit 93 generates a left-eye image and a right-eye image with the image scaling amount supplied from the parallax control parameter calculator 81, and outputs the generated left-eye image and right-eye image. The processing is then completed.

As described above, with the correction processor 54 having the first configuration, by changing the virtual inter-camera distance or/and the image scaling amount, three-dimensional distortions perceived by the user, which are caused by the difference between intended viewing environment parameters and actual viewing environment parameters, can be corrected.

In the example described above, the first correction processing is performed when only one of the three viewing environment parameters, such as the viewing distance, the display size, and the inter-eye distance, is different. However, when two or more viewing environment parameters are different, processing may also be performed in a manner similar to that discussed above. For example, if the viewing distance and the display size are different, the product of the virtual inter-camera distance changed due to a change in the viewing distance and the virtual inter-camera distance changed due to a change in the display size is the overall virtual inter-camera distance, which serves as the amount of correction.

In the example described above, the control ratio of the virtual inter-camera distance to the image scaling amount is 50:50. However, if correction is made only by using one of the virtual inter-camera distance and the image scaling amount, steps S58 and S62 or steps S59 and S63 are omitted.

4. Second Example Of Correction Processor Of Playback Apparatus

Correction processing performed by the correction processor 54 having a second configuration is discussed below.

In the above-described correction processor 54 having the first configuration, three-dimensional distortions are corrected by changing the virtual inter-camera distance and the image scaling amount. In contrast, in the correction processor 54 having the second configuration, three-dimensional distortions caused by the difference between intended viewing environment parameters and actual viewing environment parameters are corrected by shifting a left-eye image and a right-eye image in a direction in which parallax occurs (in the horizontal direction). In this case, the parallax control parameter is the amount by which image pixels forming an image are shifted.

Figure 20:
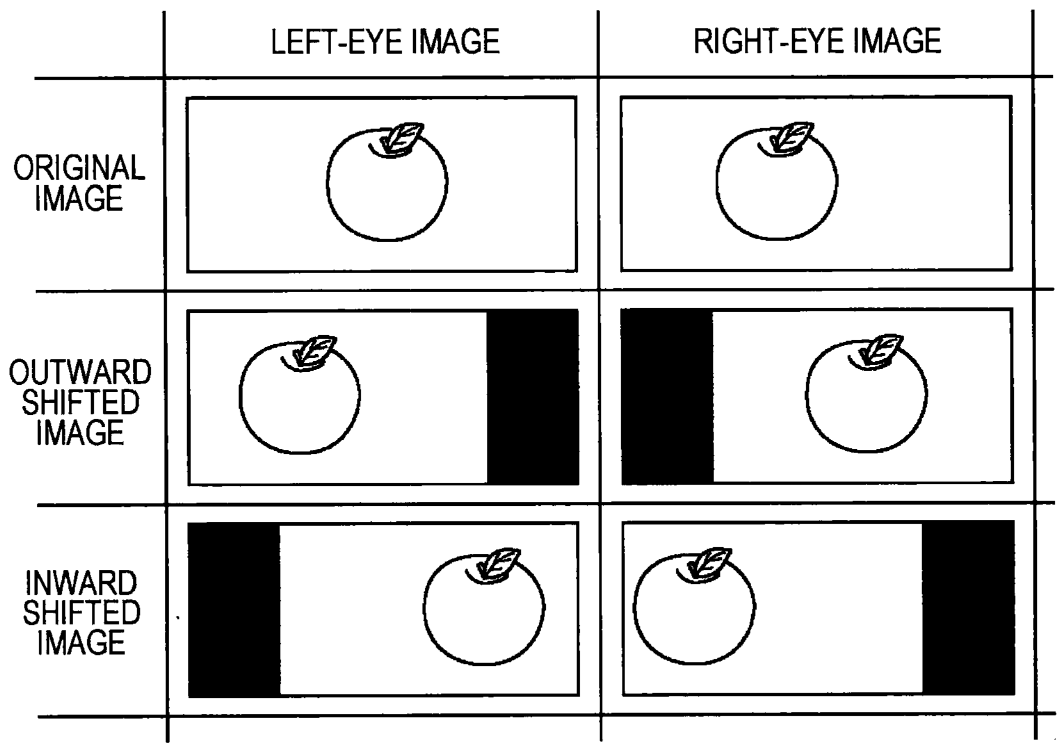
FIG. 20 illustrates correction processing performed by the correction processor having a second configuration.

FIG. 20 illustrates an example of left-eye images and right-eye images before and after corrections are made by shifting the images.

In FIG. 20, the left-eye image and the right-eye image shown as the original image are images before being corrected.

In FIG. 20, the left-eye image and the right-eye image shown as the outward shifted image are obtained by shifting the original left-eye image and right-eye image outward by a total of 100 pixels (−100 pixels) so that the depth is changed in the backward direction (away from the viewer).

In FIG. 20, the left-eye image and the right-eye image shown as the inward shifted image are obtained by shifting the original left-eye image and right-eye image inward by a total of 100 pixels (+100 pixels) so that the depth is changed in the forward direction (toward the viewer).

Figure 21:
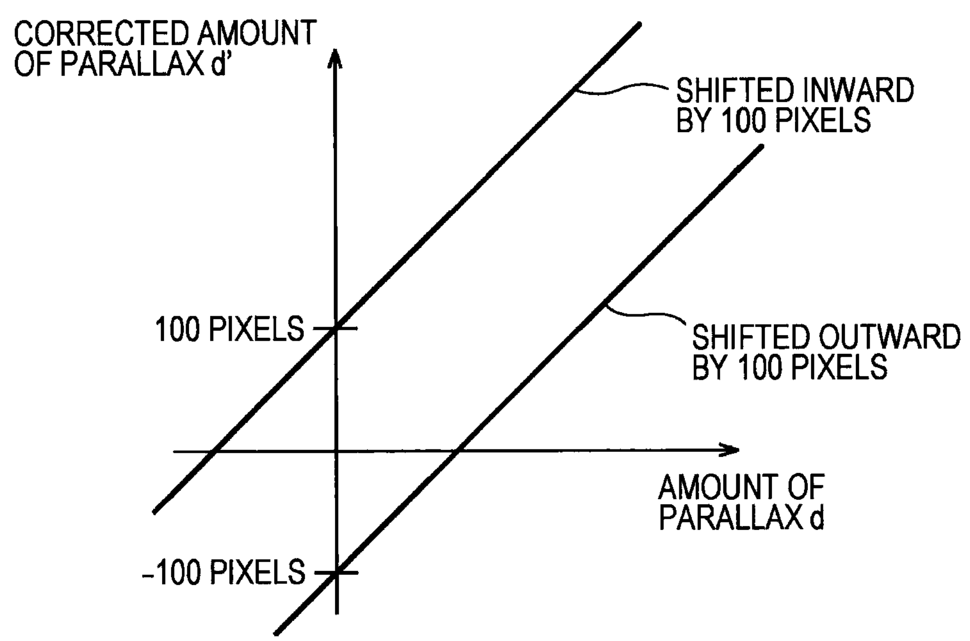
FIG. 21 illustrates correction processing performed by the correction processor having the second configuration.

FIG. 21 illustrates a change in the amount of parallax when the image is shifted in the outward direction and in the inward direction, as shown in FIG. 20.

As shown in FIG. 21, when the image is shifted outward, the depth is changed in the backward direction, and when the image is shifted inward, the depth is changed in the forward direction.

In correction processing utilizing image shifting, it is difficult to completely correct for three-dimensional distortions perceived by a user, which are caused by the difference between intended viewing environment parameters and actual viewing environment parameters. Thus, in the correction processor 54 having the second configuration, precise corrections are made to a predetermined point of the amounts of parallax, such as the average, the maximum, the minimum, or the mode, of the amounts of parallax between the pixels of the left-eye image and the associated pixels of the right-eye image.

Figure 22A:
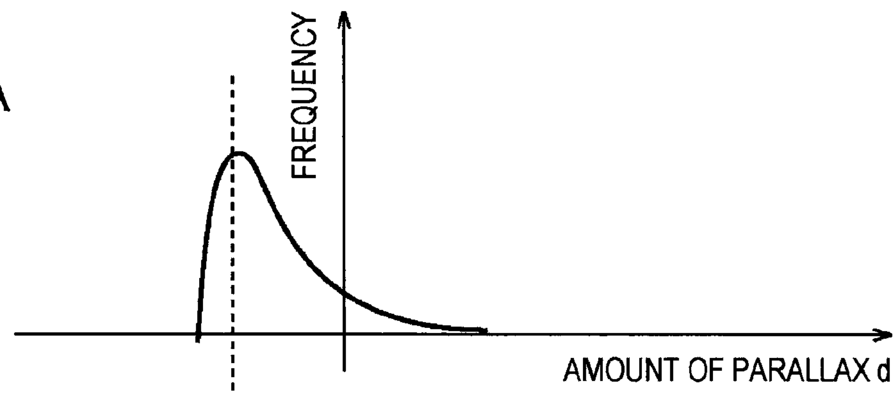
FIGS. 22A, 22B, and 22C illustrate correction processing performed by the correction processor having the second configuration.

For example, FIG. 22A illustrates the frequency distribution of the amounts of parallax between the pixels of a left-eye image and the associated pixels of a right-eye image. If the display size of actual viewing environments is twice as large as that of intended viewing environments, the frequency distribution of the amounts of parallax between the left-eye image and the right-eye image viewed by the user is shown in FIG. 22B.

Figure 22B:
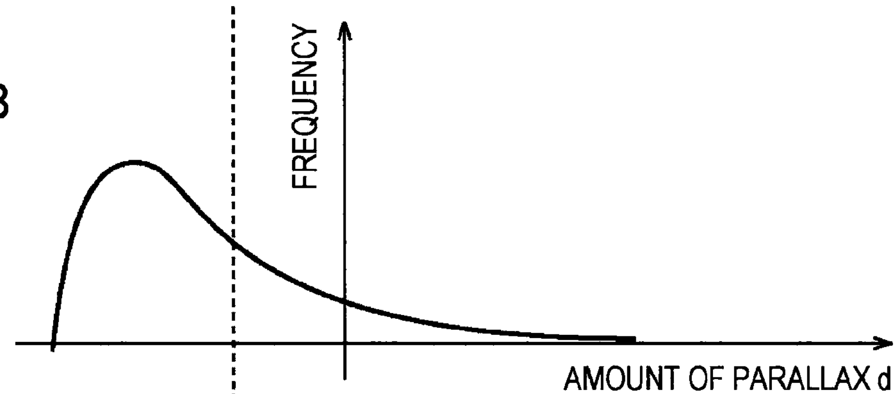

In the frequency distribution of the amounts of parallax in the actual viewing environments shown in FIG. 22B, since the display size is doubled, the depth also becomes doubled. More specifically, the depth backward from the display unit is changed further in the backward direction, and the depth forward from the display unit is changed further in the forward direction. The amount of parallax becomes twice as large as that in the intended viewing environments with respect to the parallax 0.

Figure 22C:
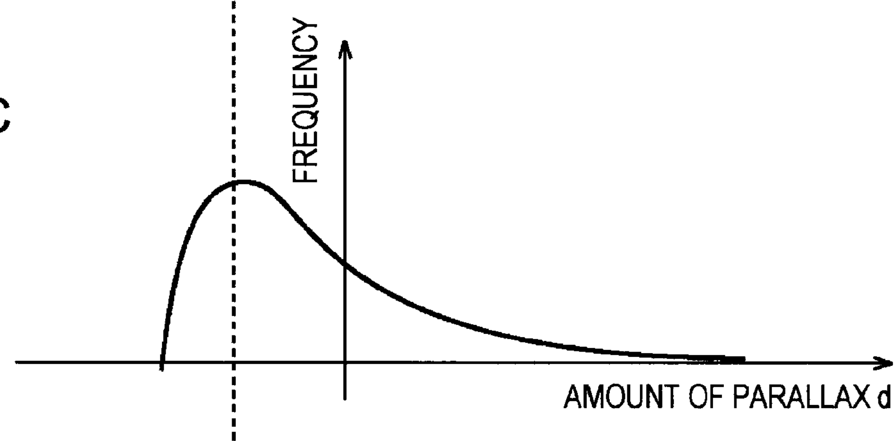

FIG. 22C shows the frequency distribution obtained by shifting the frequency distribution of the amounts of parallax in the actual viewing environments indicated by FIG. 22B so that a predetermined point of the amount of parallax, for example, the mode of the amount of parallax, shown in FIG. 22B coincides with that of FIG. 22A.

In this manner, in the correction processor 54 having the second configuration, image shifting processing for precisely correcting a predetermined point of the amounts of parallax between a left-eye image and a right-eye image is performed.

FIG. 23 is a block diagram illustrating an example of the second configuration of the correction processor 54 that performs the above-described image shifting processing.

The correction processor 54 shown in FIG. 23 includes a parallax control parameter calculator 101 and a parallax controller 102. The parallax controller 102 includes a parallax detector 111 and an image shifting unit 112.

Intended viewing environment parameters received from the reader 51 and actual viewing environment parameters received from the operation input unit 55 are supplied to the parallax control parameter calculator 101. A parallax map is also supplied to the parallax control parameter calculator 101 from the parallax detector 111 of the parallax controller 102.

The parallax control parameter calculator 101 generates, based on the parallax map supplied from the parallax detector 111, a frequency distribution of the amounts of parallax between the pixels of a left-eye image and the associated pixels of a right-eye image.

The parallax control parameter calculator 101 calculates the amount by which an image is to be shifted (such an amount is hereinafter referred to as the "image shifting amount"). This image shifting is performed by shifting a predetermined reference point of the generated frequency distribution on the basis of the difference between intended viewing environment parameters and actual viewing environment parameters. In response to an instruction given from a user utilizing, for example, a setting screen, the parallax control parameter calculator 101 stores therein which one of the average, the maximum, the minimum, and the mode of the amounts of parallax between the pixels of a left-eye image and the associated pixels of a right-eye image is used as the reference point. The parallax control parameter calculator 101 supplies the calculated image shifting amount to the image shifting unit 112 of the parallax controller 102.

As in the parallax detector 91 of the correction processor 54 having the first configuration shown in FIG. 9, the parallax detector 111 detects the amount of parallax between each pixel of a left-eye image and the associated pixel of a right-eye image by using, for example, a block matching method. The resulting parallax map is supplied to the parallax control parameter calculator 101.

The image shifting unit 112 executes an image shifting operation on the left-eye image and the right-eye image, which form the original image (before being corrected) supplied from the video decoder 53 (FIG. 7) in accordance with the image shifting amount supplied from the parallax control parameter calculator 101. Then, the image data of the left-eye image and the right-eye image subjected to the image shifting operation is output to the display unit 61 (FIG. 7).

A description is now given of the relationship between a change in the image shifting amount and a change in each of the viewing environment parameters, such as the viewing distance, the inter-eye distance, and the display size.

The image shifting amount when the original viewing distance L is changed by a factor S, i.e., L'=S·L, is discussed first.

The depth Za when the original viewing distance L is changed to the viewing distance L' by a factor S, i.e., L'=S·L, is expressed by equation (2). Assuming that the depth Za is indicated by Z', equation (2) can be expressed by equation (8).

The equation for correcting the amount of parallax d that makes the changed depth Z' be the same as the original depth Z is considered. Assuming that the corrected amount of parallax is designated by d' and the image shifting amount to be determined is indicated by "shift", equation (16) is defined as follows.

$$d'=f(d)=d+\text{shift} \quad (16)$$

Considering the equation d'=f(d) that makes the changed depth Z' be the same as the original depth Z, the image shifting amount can be designated by equations (17) by using equations (11).

$$d'=d\cdot E/(S\cdot E+S\cdot d-d)$$

$$d+\text{shift}=d\cdot E/(S\cdot E+S\cdot d-d)$$

$$\text{shift}=d\cdot E/(S\cdot E+S\cdot d-d)-d \quad (17)$$

Accordingly, when the original viewing distance is changed by a factor S, in order to cancel such a change in the viewing distance, an image is shifted by the image shifting amount expressed by equations (17).

For example, when the viewing distance L is 1500 mm, the display size is 46 inches, the inter-eye distance E is 65 mm, and the maximum amount of parallax is 20 pixels (pixel pitch is 0.53 mm per pixel and the lengths of the pixels are 10.6 mm), the image shifting amount "shift" when the viewing distance is increased twice is −11 pixels as calculated in the following manner.

$$\text{shift}=10.6\times 65/(2.0\times 65+2.0\times 10.6-10.6)-10.6$$

$$=-5.7\text{ mm}$$

$$=-10.8\text{ pixels}$$

$$\approx -11\text{ pixels}$$

The image shifting amount when the original inter-eye distance is changed by a factor S is discussed below.

In order to cancel a change in the inter-eye distance by a factor S, it is necessary to change the amount of parallax by a factor S, as indicated by equations (15). Since d'=d+shift as expressed by equation (16), the image shifting amount "shift" can be expressed by equations (18).

$$d'=S\cdot d$$

$$d+\text{shift}=S\cdot d$$

$$\text{shift}=(S-1)\cdot d \quad (18)$$

Accordingly, when the original inter-eye distance is changed by a factor S, in order to cancel such a change in the inter-eye distance, an image is shifted by the image shifting amount "shift" expressed by equations (18). The amount of parallax d in equations (18) indicates the amount of parallax before shifting the reference point, such as the average, the maximum, the minimum, or the mode, of the amounts of parallax between the pixels of a left-eye image and the associated pixels of a right-eye image.

For example, when the maximum of the amounts of parallax, which is the reference point before being shifted, is 20 pixels, and when the inter-eye distance is increased to be twice as large as the original inter-eye distance, the image shifting amount "shift" is calculated to be 20 pixels as follows.

$$\text{shift}=(2-1)\times 20=20$$

FIG. 24 illustrates image shifting correction processing for canceling a change in the depth, which is caused by the difference between intended viewing environment parameters and actual viewing environment parameters, such as the viewing distance, the display size, and the inter-eye distance.

In FIG. 24, the factor S that changes the viewing environment parameters is set to be 4 or ¼, i.e., the viewing distance, the display size, or the inter-eye distance is increased to four times or reduced to ¼ of the original viewing environment parameter.

Figure 25:
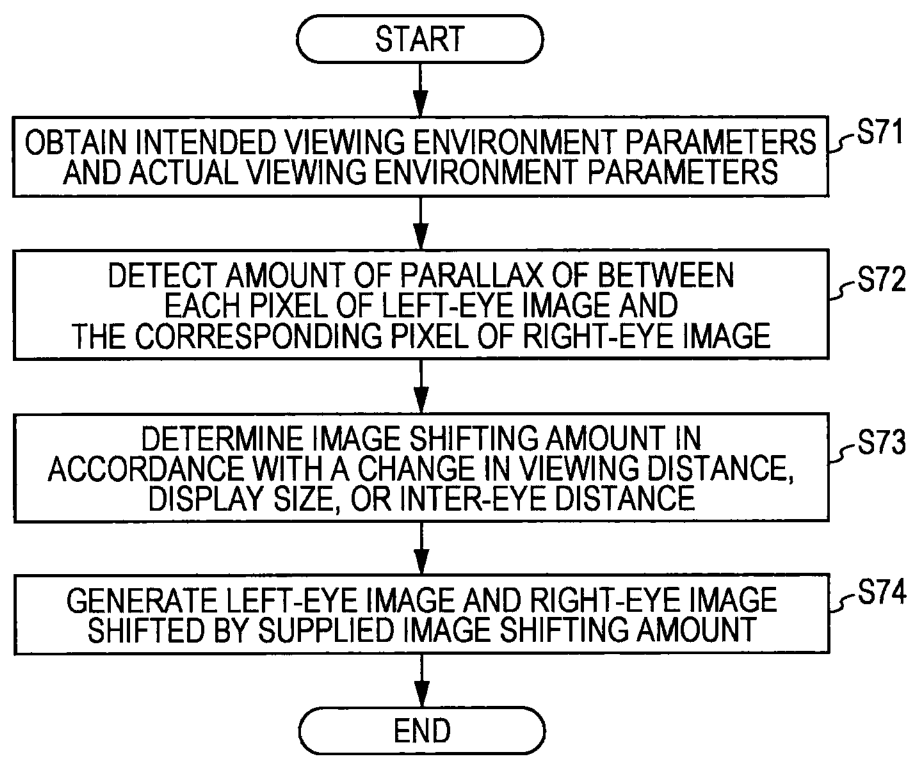
FIG. 25 is a flowchart illustrating correction processing performed by the correction processor having the second configuration.

A description is given in detail below, with reference to the flowchart of FIG. 25, of second correction processing performed by the correction processor 54 having the second configuration described above, i.e., second correction processing in step S34 in FIG. 8. As in the processing shown in FIG. 19, it is assumed that only one of the three viewing environment parameters, such as the viewing distance, the display size, and the inter-eye distance, is different between intended viewing environments and actual viewing environments.

In step S71, the parallax control parameter calculator 101 obtains intended viewing environment parameters supplied from the reader 51 and actual viewing environment parameters supplied from the operation input unit 55.

In step S72, the parallax detector 111 detects the amount of parallax between each pixel of a left-eye image and the associated pixel of a right-eye pixel supplied from the video decoder 53 according to, for example, a block matching method. The detected amounts of parallax of the corresponding pixels between the left-eye image and the right-eye image are supplied to the parallax control parameter calculator 101 as, for example, a parallax map.

In step S73, the parallax control parameter calculator 101 determines the image shifting amount in accordance with a change in the viewing distance, the display size, or the inter-eye distance. The determined image shifting amount is supplied to the image shifting unit 112.

In step S74, the image shifting unit 112 generates a left-eye image and a right-eye image shifted by the image shifting amount supplied from the parallax control parameter calculator 101. The image shifting unit 112 then outputs image data of the generated left-eye image and right-eye image. The processing is then completed.

As described above, with the correction processor 54 having the second configuration, by performing image shifting processing, three-dimensional distortions perceived by the user, which are caused by the difference between intended viewing environment parameters and actual viewing environment parameters, can be corrected.

In the above-described example, the correction processor 54 has one of the first configuration and the second configuration. However, the correction processor 54 may have both the first configuration and the second configuration so as to perform the correction processing by using any of the first configuration and the second configuration. In this case, a user may select which of the first correction processing or the second correction processing is to be performed, or the processing may be selected according to the type of picture to be played back.

Additionally, three types of viewing environment parameters, such as the viewing distance, the display size, and the inter-eye distance, are used. However, only one or two of these parameters may be used.

In the above-described example, an embodiment of the present invention is applied to a playback apparatus. However, it may be applied to apparatuses other than a playback apparatus. For example, 3D content video data and intended viewing environment parameters may be provided by transmission via a network, such as satellite broadcasting, cable television (TV), or the internet. Accordingly, an embodiment of the present invention may be applicable to a display apparatus or a recording/playback apparatus that receives 3D content video data and intended viewing environment parameters sent by transmission via a network, corrects 3D pictures in accordance with the difference between the intended viewing environment parameters and actual viewing environment parameters, and displays the resulting pictures. An embodiment of the present invention may be used as an image processing apparatus that obtains actual viewing environment parameters as well as 3D content video data and intended viewing environment parameters, and then corrects 3D video data and outputs corrected 3D video data.

5. Computer to which an Embodiment of the Present Invention Is Applied

The above-described series of processing operations may be executed by hardware or software. If software is used, a program forming that software is installed in, for example, a general-purpose computer.

Figure 26:
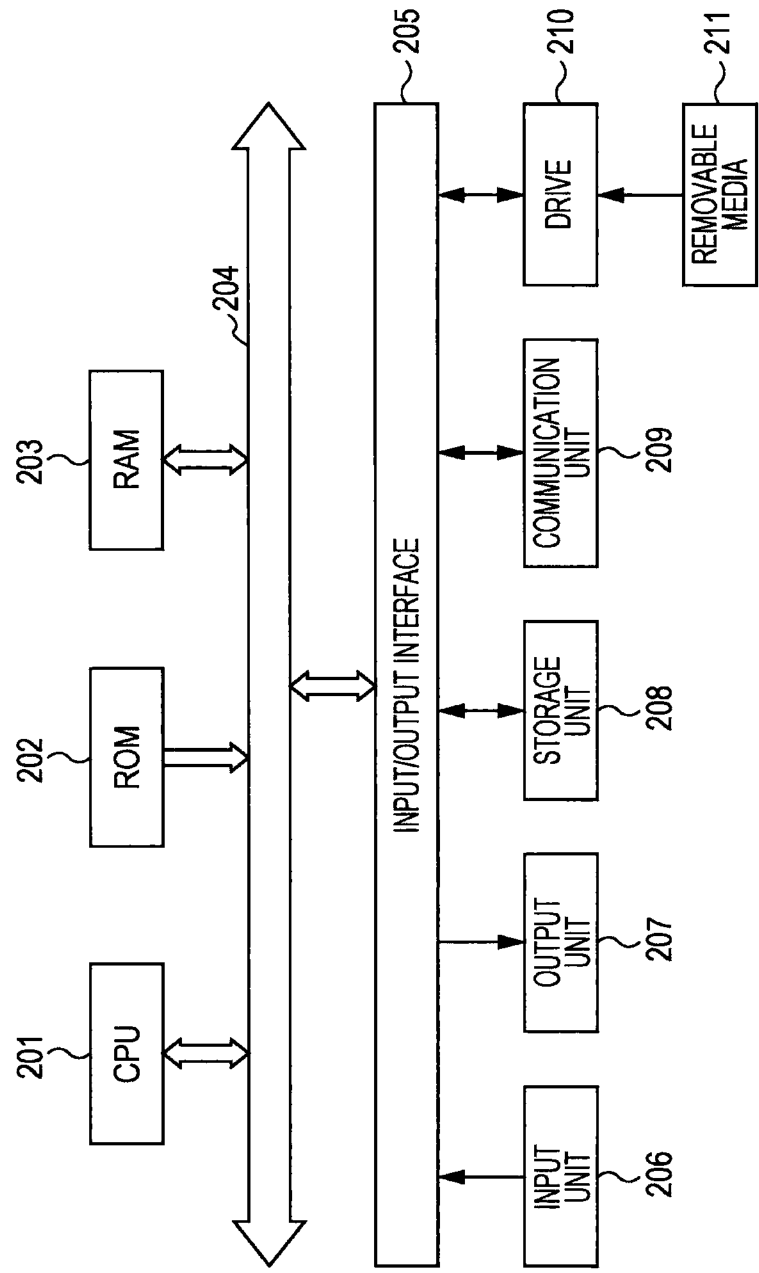
FIG. 26 is a block diagram illustrating an example of the configuration of a computer according to an embodiment of the present invention.

FIG. 26 illustrates an example of the configuration of a computer in which a program executing the above-described series of processing operations is to be installed according to an embodiment of the present invention.

The program may be recorded in advance on a storage unit 208 or a read only memory (ROM) 202, which serves as a recording medium built in the computer.

Alternatively, the program may be stored (recorded) in removable media 211. The removable media 211 may be provided as so-called package software. The removable media 211 may include a compact disc read only memory (CD-ROM), a magneto-optical (MO) disc, a digital versatile disk (DVD), a magnetic disk, a semiconductor memory, etc.

The program may be installed into the computer from the above-described removable media 211 via a drive 210. Alternatively, the program may be downloaded into the computer via a communication network or a broadcasting network and be installed in the built-in storage unit 208. That is, the program may be received by a communication unit 209 via a cabled or wireless transmission medium and be installed in the storage unit 208.

The computer has a built-in central processing unit (CPU) 201, and an input/output interface 205 is connected to the CPU 201 via a bus 204.

The CPU 201 executes the program stored in the ROM 202 in response to an instruction input from a user by operating an input unit 206 via the input/output interface 205. Alternatively, the CPU 201 may load the program stored in the storage unit 208 into a random access memory (RAM) 203 and execute the loaded program.

The CPU 201 executes processing in accordance with the above-described flowcharts or operations performed by the elements of the above-described apparatuses. Then, if necessary, the CPU 201 outputs the processing results from an output unit 207, or transmits them from the communication unit 209, or records them in the storage unit 208 via the input/output interface 205.

The input unit 206 may include a keyboard, a mouse, a microphone, etc. The output unit 207 may include a liquid crystal display (LCD), a speaker, etc.

In this specification, it is not necessary that the processing executed by the computer in accordance with the program be performed in chronological order, as in the order shown in the flowcharts. That is, the processing executed by the computer in accordance with the program includes processing executed in parallel or individually (e.g. parallel processing or object processing).

The program may be executed by a single computer (processor) or may be executed by a plurality of computers (distribute processing). The program may be transferred to a remote computer and be executed.

In the above-described embodiment, two-view 3D pictures having two viewpoints have been discussed. However, multi-view 3D pictures having three or more numbers of viewpoints may also be applied to an embodiment of the present invention.

Embodiments of the present invention are not restricted to the above-described embodiments, but various modifications may be made without departing from the gist of the invention.

The present application contains subject matter related to that disclosed in Japanese Priority Patent Application JP 2010-092816 filed in the Japan Patent Office on Apr. 14, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:

a first acquiring circuitry configured to acquire an intended viewing environment parameter, which is a parameter of an intended viewing environment, together with image data of an original three-dimensional picture;

a second acquiring circuitry configured to acquire an actual viewing environment parameter, which is a parameter of an actual viewing environment for a user viewing the original three-dimensional picture, wherein each of the intended viewing environment parameter and the actual viewing environment parameter includes an inter-eye distance; and a correction processing circuitry configured to correct the original three-dimensional picture in accordance with a difference between the acquired intended viewing environment parameter and the acquired actual viewing environment parameter, wherein the correction processing circuitry is also configured to:

determine a control ratio between a virtual inter-camera distance and an image scaling amount;

generate a first corrected three-dimensional picture based on the original three-dimensional picture, the first corrected three-dimensional picture including a virtual inter-camera distance determined based on the control ratio; and perform image scaling on the first corrected three-dimensional picture based on the image scaling amount determined from the control ratio, the image scaling generating a second corrected three-dimensional picture.

2. The image processing apparatus according to claim 1, wherein each of the intended viewing environment parameter and the actual viewing environment parameter includes at least one of a viewing distance, and a display size.

3. The image processing apparatus according to claim 2, wherein:

the acquired image data of the original three-dimensional picture includes a left-eye image and a right-eye image captured with a predetermined inter-camera distance; and the correction processing circuitry includes a virtual inter-camera distance image generating circuitry configured to generate a left-eye image and a right-eye image captured with the virtual inter-camera distance changed from the predetermined inter-camera distance, an image scaling configured to scale the left-eye image and the right-eye image generated by the virtual inter-camera distance image generating circuitry, and a control parameter calculating circuitry configured to calculate the virtual inter-camera distance used in the virtual inter-camera distance image generating circuitry, or the image scaling amount used in the image scaling circuitry, from a difference between the inter-eye distance, the viewing distance, or the display size forming the intended viewing environment parameter, and the inter-eye distance, the viewing distance, or the display size forming the actual viewing environment parameter.

4. The image processing apparatus according to claim 2, wherein:

the acquired image data of the original three-dimensional picture includes a left-eye image and a right-eye image; and the correction processing circuitry includes image shifting processing circuitry for shifting the left-eye image and the right-eye image so that an amount of parallax between the left-eye image and the right-eye image becomes a predetermined amount, and control parameter calculating circuitry for calculating an image shifting amount, so that the amount of parallax between the left-eye image and the right-eye image becomes the predetermined amount, from a difference between the inter-eye distance, the viewing distance, or the display size forming the intended viewing environment parameter, and the inter-eye distance, the viewing distance, or the display size forming the actual viewing environment parameter.

5. An image processing method for an image processing apparatus including a first acquiring circuitry configured to acquire data, a second acquiring circuitry configured to acquire data, and a correction processing circuitry configured to correct an original three-dimensional picture, the image processing method comprising the steps of:

acquiring by the first acquiring circuitry an intended viewing environment parameter, which is a parameter of an intended viewing environment, together with image data of the original three-dimensional picture;

acquiring by the second acquiring circuitry an actual viewing environment parameter, which is a parameter of an actual viewing environment for a user viewing the original three-dimensional picture, wherein each of the intended viewing environment parameter and the actual viewing environment parameter includes an inter-eye distance; and correcting by the correction processing circuitry the original three-dimensional picture in accordance with a difference between the acquired intended viewing environment parameter and the acquired actual viewing environment parameter, wherein the correction processing circuitry is also configured to:

determine a control ratio between a virtual inter-camera distance and an image scaling amount;

generate a first corrected three-dimensional picture based on the original three-dimensional picture, the first corrected three-dimensional picture including a virtual inter-camera distance determined based on the control ratio; and perform image scaling on the first corrected three-dimensional picture based on the image scaling amount determined from the control ratio, the image scaling generating a second corrected three-dimensional picture.

6. A non-transitory computer-readable medium having stored therein a program that comprises instructions for allowing a computer to execute a method comprising the steps of:

acquiring an intended viewing environment parameter, which is a parameter of an intended viewing environment, together with image data of an original three-dimensional picture;

acquiring an actual viewing environment parameter, which is a parameter of an actual viewing environment for a user viewing the original three-dimensional picture, wherein each of the intended viewing environment parameter and the actual viewing environment parameter includes an inter-eye distance; and correcting the original three-dimensional picture in accordance with a difference between the acquired intended viewing environment parameter and the acquired actual viewing environment parameter, wherein correcting the original three-dimensional picture includes:

determining a control ratio between a virtual inter-camera distance and an image scaling amount;

generating a first corrected three-dimensional picture based on the original three-dimensional picture, the first corrected three-dimensional picture including a virtual inter-camera distance determined based on the control ratio; and performing image scaling on the first corrected three-dimensional picture based on the image scaling amount determined from the control ratio, the image scaling generating a second corrected three-dimensional picture.

7. An image processing apparatus comprising:

a first acquiring unit configured to acquire an intended viewing environment parameter, which is a parameter of an intended viewing environment, together with image data of an original three-dimensional picture;

a second acquiring unit configured to acquire an actual viewing environment parameter, which is a parameter of an actual viewing environment for a user viewing the original three-dimensional picture, wherein each of the intended viewing environment parameter and the actual viewing environment parameter includes an inter-eye distance; and a correction processor configured to correct the original three-dimensional picture in accordance with a difference between the acquired intended viewing environment parameter and the acquired actual viewing environment parameter, wherein the correction processor is configured to determine a control ratio between a virtual inter-camera distance and an image scaling amount;

generate a first corrected three-dimensional picture based on the original three-dimensional picture, the first corrected three-dimensional picture including a virtual inter-camera distance determined based on the control ratio; and perform image scaling on the first corrected three-dimensional picture based on the image scaling amount determined from the control ratio, the image scaling generating a second corrected three-dimensional picture.

8. The image processing method of claim 5, wherein each of the intended viewing environment parameter and the actual viewing environment parameter includes at least one of a viewing distance, and a display size.

9. The image processing method of claim 5, wherein the acquired image data of the original three-dimensional picture includes a left-eye image and a right-eye image captured with a predetermined inter-camera distance, and wherein the method further comprises: generating a left-eye image and a right-eye image captured with the virtual inter-camera distance changed from the predetermined inter-camera distance; scaling the left-eye image and the right-eye image; and calculating the virtual inter-camera distance, or the image scaling amount, from a difference between the inter-eye distance, the viewing distance, or the display size forming the intended viewing environment parameter, and the inter-eye distance, the viewing distance, or the display size forming the actual viewing environment parameter.

10. The method of claim 8, wherein the acquired image data of the original three-dimensional picture includes a left-eye image and a right-eye image, and wherein the method further comprises:

shifting the left-eye image and the right-eye image so that an amount of parallax between the left-eye image and the right-eye image becomes a predetermined amount; and calculating an image shifting amount, so that the amount of parallax between the left-eye image and the right-eye image becomes the predetermined amount, from a difference between the inter-eye distance, the viewing distance, or the display size forming the intended viewing environment parameter, and the inter-eye distance, the viewing distance, or the display size forming the actual viewing environment parameter.

11. The non-transitory computer-readable medium of claim 6, wherein each of the intended viewing environment parameter and the actual viewing environment parameter includes at least one of a viewing distance, and a display size.

12. The non-transitory computer-readable medium of claim 11, wherein the acquired image data of the original three-dimensional picture includes a left-eye image and a right-eye image captured with a predetermined inter-camera distance, and wherein the method further comprises:

generating a left-eye image and a right-eye image captured with the virtual inter-camera distance changed from the predetermined inter-camera distance;

scaling the left-eye image and the right-eye image; and calculating the virtual inter-camera distance, or the image scaling amount, from a difference between the inter-eye distance, the viewing distance, or the display size forming the intended viewing environment parameter, and the inter-eye distance, the viewing distance, or the display size forming the actual viewing environment parameter.

13. The non-transitory computer-readable medium of claim 11, wherein the acquired image data of the original three-dimensional picture includes a left-eye image and a right-eye image, and wherein the method further comprises:

shifting the left-eye image and the right-eye image so that an amount of parallax between the left-eye image and the right-eye image becomes a predetermined amount; and calculating an image shifting amount, so that the amount of parallax between the left-eye image and the right-eye image becomes the predetermined amount, from a difference between the inter-eye distance, the viewing distance, or the display size forming the intended viewing environment parameter, and the inter-eye distance, the viewing distance, or the display size forming the actual viewing environment parameter.

14. The image processing apparatus of claim 7, wherein each of the intended viewing environment parameter and the actual viewing environment parameter includes at least one of a viewing distance, and a display size.

15. The image processing apparatus of claim 14, wherein the acquired image data of the original three-dimensional picture includes a left-eye image and a right-eye image captured with a predetermined inter-camera distance; and wherein the correction processor includes a virtual inter-camera distance image generating unit for generating a left-eye image and a right-eye image captured with the virtual inter-camera distance changed from the predetermined inter-camera distance, an image scaling unit for scaling the left-eye image and the right-eye image generated by the virtual inter-camera distance image generating unit, and a control parameter calculating unit for calculating the virtual inter-camera distance used in the virtual inter-camera distance image generating unit, or the image scaling amount used in the image scaling unit, from a difference between the inter-eye distance, the viewing distance, or the display size forming the intended viewing environment parameter, and the inter-eye distance, the viewing distance, or the display size forming the actual viewing environment parameter.

16. The image processing apparatus of claim 14, wherein:

the acquired image data of the original three-dimensional picture includes a left-eye image and a right-eye image; and the correction processor includes an image shifting processing unit for shifting the left-eye image and the right-eye image so that an amount of parallax between the left-eye image and the right-eye image becomes a predetermined amount, and a control parameter calculating unit for calculating an image shifting amount, so that the amount of parallax between the left-eye image and the right-eye image becomes the predetermined amount, from a difference between the inter-eye distance, the viewing distance, or the display size forming the intended viewing environment parameter, and the inter-eye distance, the viewing distance, or the display size forming the actual viewing environment parameter.

* * * * *